(12) United States Patent
Fujimura et al.

(10) Patent No.: US 12,387,029 B2
(45) Date of Patent: Aug. 12, 2025

(54) COMPUTING PARASITIC VALUES FOR SEMICONDUCTOR DESIGNS

(71) Applicant: D2S, Inc., San Jose, CA (US)

(72) Inventors: Akira Fujimura, Saratoga, CA (US); Nagesh Shirali, San Jose, CA (US); Donald Oriordan, Sunnyvale, CA (US)

(73) Assignee: D2S, INC., San Jose, CA (US)

( * ) Notice: Subject to any disclaimer, the term of this patent is extended or adjusted under 35 U.S.C. 154(b) by 330 days.

(21) Appl. No.: 17/889,370

(22) Filed: Aug. 16, 2022

(65) Prior Publication Data

US 2023/0186009 A1 Jun. 15, 2023

Related U.S. Application Data

(63) Continuation of application No. 17/871,893, filed on Jul. 22, 2022.
(Continued)

(51) Int. Cl.
*G06F 30/3953* (2020.01)
*G06F 30/27* (2020.01)
(Continued)

(52) U.S. Cl.
CPC .......... *G06F 30/3953* (2020.01); *G06F 30/27* (2020.01); *G06F 30/392* (2020.01);
(Continued)

(58) Field of Classification Search
USPC ....................................................... 716/136
See application file for complete search history.

(56) References Cited

U.S. PATENT DOCUMENTS

| 7,269,817 B2 | 9/2007 | Heng et al. |
| 7,526,748 B2 | 4/2009 | Kotani et al. |
| (Continued) | | |

FOREIGN PATENT DOCUMENTS

| CN | 104133955 A | 11/2014 |
| CN | 107438842 A | 12/2017 |
| (Continued) | | |

OTHER PUBLICATIONS

Ajayi, Tutu, et al., "OpenRoad: Toward a Self-Driving, Open-Source Digital Layout Implementation Tool Chain," Proceedings of Government Microcircuit Applications and Critical Technology Conference, Jan. 1, 2019, 6 pages, National Science Foundation, retrieved from https://vlsicad.ucsd.edu/Publications/Conferences/370/c370.pdf.

(Continued)

*Primary Examiner* — Bryce M Aisaka
(74) *Attorney, Agent, or Firm* — ADELI LLP

(57) ABSTRACT

Some embodiments provide a method for calculating parasitic parameters for a pattern to be manufactured on an integrated circuit (IC) substrate. The method receives a definition of a wire structure as input. The method rasterizes the wire structure (e.g., produces pixel-based definition of the wire structure) to produce several images. Before rasterizing the wire structure, the method in some embodiments decomposes the wire structure into several components (e.g., several wires, wire segments or wire structure portions), which it then individually rasterizes. The method then uses the images as inputs to a neural network, which then calculates parasitic parameters associated with the wire structure. In some embodiments, the parasitic parameters include unwanted parasitic capacitance effects exerted on the wire structure. Conjunctively, or alternatively, these parameters include unwanted parasitic resistance and/or inductance effects on the wire structure.

20 Claims, 17 Drawing Sheets

Related U.S. Application Data

(60) Provisional application No. 63/203,455, filed on Jul. 23, 2021.

(51) Int. Cl.

| | | |
|---|---|---|
| *G06F 30/392* | (2020.01) | |
| *G06F 30/398* | (2020.01) | |
| *G06N 3/045* | (2023.01) | |
| *G06T 7/00* | (2017.01) | |
| *G06F 119/06* | (2020.01) | |
| *G06F 119/10* | (2020.01) | |
| *H10D 86/40* | (2025.01) | |
| *H10D 86/60* | (2025.01) | |
| *H10D 89/60* | (2025.01) | |

(52) U.S. Cl.
CPC ........... *G06F 30/398* (2020.01); *G06N 3/045* (2023.01); *G06T 7/0004* (2013.01); *G06T 7/0006* (2013.01); *G06F 2119/06* (2020.01); *G06F 2119/10* (2020.01); *G06T 2207/20084* (2013.01); *G06T 2207/30121* (2013.01); *G06T 2207/30148* (2013.01); *H10D 86/441* (2025.01); *H10D 86/60* (2025.01); *H10D 89/60* (2025.01)

(56) References Cited

U.S. PATENT DOCUMENTS

| | | | |
|---|---|---|---|
| 7,754,401 | B2 | 7/2010 | Fujimura et al. |
| 8,473,875 | B2 | 6/2013 | Fujimura et al. |
| 8,584,066 | B1 | 11/2013 | Mau et al. |
| 8,818,072 | B2 | 8/2014 | Ong et al. |
| 10,012,900 | B2 | 7/2018 | Kim et al. |
| 10,444,629 | B2 | 10/2019 | Zable |
| 10,520,830 | B2 | 12/2019 | Kicken et al. |
| 10,670,973 | B2 | 6/2020 | Zou et al. |
| 10,678,142 | B2 | 6/2020 | Jheng et al. |
| 10,923,318 | B2 | 2/2021 | Gledhill et al. |
| 10,949,595 | B2 | 3/2021 | Tsutsui et al. |
| 11,043,359 | B2 | 6/2021 | Nakamura et al. |
| 2004/0210863 | A1 | 10/2004 | Culp et al. |
| 2005/0132306 | A1 | 6/2005 | Smith et al. |
| 2005/0251771 | A1 | 11/2005 | Robles |
| 2006/0190911 | A1 | 8/2006 | Stivers |
| 2008/0109766 | A1 | 5/2008 | Song et al. |
| 2011/0089345 | A1 | 4/2011 | Komagata et al. |
| 2012/0151422 | A1 | 6/2012 | White et al. |
| 2013/0022929 | A1 | 1/2013 | Komagata et al. |
| 2013/0159943 | A1 | 6/2013 | Agarwal et al. |
| 2013/0283216 | A1 | 10/2013 | Pearman et al. |
| 2013/0283218 | A1 | 10/2013 | Fujimura et al. |
| 2014/0007033 | A1 | 1/2014 | Kitamura et al. |
| 2016/0125120 | A1 | 5/2016 | Yu et al. |
| 2017/0194126 | A1 | 7/2017 | Bhaskar et al. |
| 2017/0357911 | A1 | 12/2017 | Liu et al. |
| 2018/0067900 | A1 | 3/2018 | Mos et al. |
| 2019/0146355 | A1 | 5/2019 | Jheng et al. |
| 2019/0197213 | A1 | 6/2019 | Ungar |
| 2019/0206041 | A1 | 7/2019 | Fang et al. |
| 2019/0377849 | A1 | 12/2019 | Sha et al. |
| 2019/0385300 | A1 | 12/2019 | Baidya et al. |
| 2020/0006328 | A1 | 1/2020 | Yamazaki et al. |
| 2020/0051781 | A1 | 2/2020 | Fujimura et al. |
| 2020/0065453 | A1 | 2/2020 | Kim et al. |
| 2020/0134131 | A1 | 4/2020 | Tien et al. |
| 2020/0184137 | A1 | 6/2020 | Tsutsui et al. |
| 2020/0233931 | A1* | 7/2020 | Kourkoulos ............ G06F 30/33 |
| 2020/0364394 | A1 | 11/2020 | Yu et al. |
| 2020/0380089 | A1 | 12/2020 | Gheith et al. |
| 2020/0380362 | A1 | 12/2020 | Cao et al. |
| 2020/0387660 | A1 | 12/2020 | Cecil |
| 2021/0048741 | A1 | 2/2021 | Lugg et al. |
| 2021/0181620 | A1 | 6/2021 | Poonawala et al. |
| 2021/0216697 | A1 | 7/2021 | Brink et al. |
| 2021/0248299 | A1* | 8/2021 | Kourkoulos ............ G06F 30/398 |
| 2021/0279878 | A1 | 9/2021 | Adler et al. |
| 2021/0397172 | A1 | 12/2021 | Slachter et al. |
| 2022/0035237 | A1 | 2/2022 | Lee et al. |
| 2022/0050381 | A1 | 2/2022 | Biswas et al. |
| 2022/0128899 | A1 | 4/2022 | Fujimura et al. |
| 2022/0147682 | A1 | 5/2022 | Koumura |
| 2022/0187713 | A1 | 6/2022 | Middlebrooks et al. |
| 2022/0299881 | A1 | 9/2022 | Zheng et al. |
| 2023/0024684 | A1 | 1/2023 | Fujimura et al. |
| 2023/0027655 | A1 | 1/2023 | Fujimura et al. |
| 2023/0032510 | A1 | 2/2023 | Fujimura et al. |
| 2023/0092665 | A1 | 3/2023 | Fujimura et al. |
| 2023/0107556 | A1 | 4/2023 | Tao et al. |
| 2023/0168660 | A1 | 6/2023 | Oriordan et al. |
| 2023/0169245 | A1 | 6/2023 | Oriordan et al. |
| 2023/0169246 | A1 | 6/2023 | Oriordan et al. |
| 2023/0169247 | A1 | 6/2023 | Oriordan et al. |
| 2023/0205972 | A1 | 6/2023 | Oriordan et al. |
| 2023/0229836 | A1 | 7/2023 | Oriordan et al. |
| 2023/0229840 | A1 | 7/2023 | Oriordan et al. |
| 2023/0229844 | A1 | 7/2023 | Oriordan et al. |
| 2023/0267265 | A1 | 8/2023 | Oriordan |
| 2023/0274065 | A1 | 8/2023 | Fujimura |
| 2023/0274066 | A1 | 8/2023 | Fujimura |
| 2023/0274067 | A1 | 8/2023 | Fujimura |
| 2023/0274068 | A1 | 8/2023 | Fujimura |
| 2023/0274069 | A1 | 8/2023 | Fujimura |
| 2023/0274070 | A1 | 8/2023 | Fujimura |
| 2023/0274071 | A1 | 8/2023 | Fujimura |
| 2023/0281374 | A1 | 9/2023 | Fujimura |
| 2023/0282635 | A1 | 9/2023 | Fujimura |
| 2023/0306177 | A1 | 9/2023 | Fujimura |
| 2023/0351087 | A1 | 11/2023 | Oriordan et al. |
| 2023/0351088 | A1 | 11/2023 | Oriordan et al. |
| 2023/0351089 | A1 | 11/2023 | Oriordan et al. |
| 2023/0359804 | A1 | 11/2023 | Oriordan |
| 2024/0288764 | A1 | 8/2024 | Hamouda |

FOREIGN PATENT DOCUMENTS

| | | |
|---|---|---|
| CN | 111758072 A | 10/2020 |
| CN | 113168085 A | 7/2021 |
| CN | 113168115 A | 7/2021 |
| CN | 110998585 A | 7/2024 |
| EP | 3951496 A1 | 2/2022 |
| JP | 2006053248 A | 2/2006 |
| JP | 2007536581 A | 12/2007 |
| JP | 2012181298 A | 9/2012 |
| JP | 2019114295 A | 7/2019 |
| JP | 2021509208 A | 3/2021 |
| KR | 102170578 B1 | 10/2020 |
| KR | 20210010897 A | 1/2021 |
| KR | 102377411 B1 | 3/2022 |
| TW | I483133 B | 5/2015 |
| TW | 201834149 A | 9/2018 |
| TW | I710763 B | 11/2020 |
| TW | 202113501 A | 4/2021 |
| TW | 202121050 A | 6/2021 |
| WO | 2018125220 A1 | 7/2018 |
| WO | 2020188397 A1 | 9/2020 |
| WO | 2020193095 A1 | 10/2020 |
| WO | 2021041963 A1 | 3/2021 |
| WO | 2021043936 A1 | 3/2021 |
| WO | 2022086825 A1 | 4/2022 |
| WO | 2023003918 A2 | 1/2023 |

OTHER PUBLICATIONS

Ao, Jianchang, et al., "Delay-Driven Layer Assignment in Global Routing under Multi-tier Interconnect Structure," ISPD '13: Proceedings of the 2013 ACM International Symposium on Physical Design, Mar. 2013, 7 pages, ACM, retrieved from https://dl.acm.org/doi/10.1145/2451916.2451942.

Arora, Narain D., et al., "Modeling and Extraction of Interconnect Capacitances for Multilayer VLSI Circuits," IEEE Transactions on

(56) References Cited

OTHER PUBLICATIONS

Computer-Aided Design of Integrated Circuits and Systems, Jan. 1996, 10 pages, vol. 15, No. 1, IEEE, retrieved from https://web.stanford.edu/class/archive/ee/ee371/ee371.1066/handouts/arora96.pdf.
Author Unknown, "D2S Enables "Stitchless" Full-Chip Inverse Lithography Technology in a Single Day for the Multi-Beam Era," Press Release, Sep. 16, 2019, 3 pages, D2S, Inc., San Jose, California, USA.
Author Unknown, "D2S Unveils Industry's First Mask-Wafer Double Simulation Platform," Press Release, Sep. 20, 2011, 3 pages, D2S, Inc., San Jose, California, USA.
Author Unknown, "Deep reinforcement learning," Wikipedia, Sep. 21, 2020, 2 pages, Wikipedia.com.
Author Unknown, "Design rule checking," Wikipedia, May 27, 2020, 4 pages, Wikipedia.com.
Author Unknown, "Marching squares," Wikipedia, Dec. 30, 2019, 9 pages, Wikipedia.com.
Author Unknown, "Multiple patterning," Wikipedia, Oct. 10, 2020, 22 pages, Wikipedia.com.
Author Unknown, "Optical proximity correction," Wikipedia, Apr. 28, 2019, 5 pages, Wikipedia.com.
Author Unknown, "Quantus Extraction Solution," Cadence Datasheet, Aug. 2019, 4 pages, Cadence Design Systems, Inc., retrieved from https://www.cadence.com/content/dam/cadence-www/global/en_US/documents/tools/digital-design-signoff/quantus-extraction-ds.pdf.
Author Unknown, "Rasterisation," Wikipedia, Aug. 21, 2020, 4 pages, Wikipedia.com.
Author Unknown, "StarRC," Synopsys Datasheet, Nov. 2015, 7 pages, Synopsys, Inc., retrieved from https://www.synopsys.com/content/dam/synopsys/implementation&signoff/datasheets/starrc-ds.pdf.
Author Unknown, "TrueMask® DS," Exact Date Unknown but Before May 2020, 3 pages, D2S, Inc., retrieved from https://design2silicon.com/products/truemask-ds/.
Author Unknown, "TrueMask® ILT Backgrounder Stitchless Full-Chip ILT in a Day," Backgrounder, Sep. 2019, 6 pages, D2S, Inc., San Jose, California, USA.
Author Unknown, "TrueMask® ILT," Exact Date Unknown but Before May 2020, 7 pages, D2S, Inc., retrieved from https://design2silicon.com/products/truemask-ilt/.
Cecil, Thomas, et al., "Establishing Fast, Practical, Full-Chip ILT Flows Using Machine Learning," SPIE Proceedings 11327, Optical Microlithography XXXIII, Mar. 23, 2020, 19 pages, vol. 1132706, SPIE, San Jose, California, USA.
Chen, Kun-Yuan, et al., "Full-Chip Application of Machine Learning SRAFs on DRAM Case Using Auto Pattern Selection," SPIE Proceedings 10961, Optical Microlithography XXXII, Oct. 10, 2019, 13 pages, vol. 1096108, SPIE, San Jose, California, USA.
Chen, Tai-Chen, "Multilevel Full-Chip Gridless Routing With Applications to Optical-Proximity Correction," Jun. 2007, 13 pages, IEEE, retrieved from http://cc.ee.ntu.edu.tw/~ywchang/Papers/tcad07-mgr.pdf.
Chow, Karen, "Parasitic Extraction for Accurate Signal Integrity Analysis at Advanced Nodes," Design With Calibre, Mar. 15, 2016, 7 pages, Siemens, retrieved from https://blogs.sw.siemens.com/calibre/2016/03/15/parasitic-extraction-for-accurate-signal-integrity-analysis-at-advanced-nodes-2/.
Cong, Jason, et al., "Analysis and Justification of a Simple, Practical 2 1/2-D Capacitance Extraction Methodology," DAC '97: Proceedings of the 34th annual Design Automation Conference, Jun. 13, 1997, 6 pages, Association for Computing Machinery, New York, New York, USA.
Geuzaine, Christophe, et al., "Gmsh: a three-dimensional finite element mesh generator with built-in pre- and post-processing facilities," International Journal for Numerical Methods in Engineering, Sep. 10, 2009, 24 pages, vol. 79, Issue 11, John Wiley & Sons, Ltd., Hoboken, New Jersey, USA.

Ibtehaz, Nabil, et al., "MultiResUNet: Rethinking the U-Net Architecture for Multimodal Biomedical Image Segmentation," Feb. 11, 2019, 25 pages, retrieved from https://arxiv.org/pdf/1902.04049.pdf.
Jia, Ningning, et al., "Machine Learning for Inverse Lithography: using stochastic gradient descent for robust photomask synthesis," Journal of Optics, Apr. 1, 2010, 9 pages, vol. 12, IOP Publishing, retrieved from https://www.eee.hku.hk/optima/pub/journal/1004_JO.pdf.
Kao, William H., et al., "Parasitic Extraction: Current State of the Art and Future Trends," Proceedings of the IEEE, May 5, 2001, 11 pages, vol. 89, No. 5, IEEE, retrieved from https://citeseerx.ist.psu.edu/viewdoc/download?doi=10.1.1.125.8162&rep=rep1&type=pdf.
Kwan, Joe, et al., "Applying Machine Learning Techniques to Accelerate Advanced Process Yield Ramp," Jan. 5, 2021, 29 pages, Siemens Digital Industries Software, Munich, Germany.
Lin, Yibo, et al., "Machine Learning for Yield Learning and Optimization," 2018 IEEE International Test Conference (ITC), Oct. 29-Nov. 1, 2018, 10 pages, IEEE, Phoenix, AZ, USA.
Liu, Peng, "Mask Synthesis Using Machine Learning Software and Hardware Platforms," SPIE Proceedings 11327, Optical Microlithography XXXIII, Mar. 23, 2020, 17 pages, vol. 1132707, SPIE, San Jose, California, USA.
Nabors, K., et al., "FastCap User's Guide," Research Laboratory of Electronics, Sep. 18, 1992, 57 pages, Massachusetts Institute of Technology, retrieved from https://www.fastfieldsolvers.com/Download/FastCap_User_Guide.pdf.
Pang, Linyong (Leo), et al., "Study of Mask and Wafer Co-design That Utilizes a New Extreme SIMD Approach to Computing in Memory Manufacturing: Full-Chip Curvilinear ILT in a Day," SPIE Proceedings 11148, Photomask Technology 2019, Oct. 3, 2019, 16 pages, vol. 111480U, SPIE, retrieved from https://design2silicon.com/wp-content/uploads/2019/11/2019-BACUS-Full-Chip-Curvilinear-ILT-091219s-003.pdf.
Pang, Linyong, "Inverse Lithography Technology: 30 years from concept to practical, full-chip reality," Journal of Micro/Nanopatterning, Materials, and Metrology, Aug. 31, 2021, 49 pages, vol. 20(3), SPIE, retrieved from https://www.spiedigitallibrary.org/journals/journal-of-micro-nanopatterning-materials-and-metrology/volume-20/issue-03-030901/Inverse-lithography-technology--30-years-from-concept-to-practical/10.1117/1.JMM.20.3.030901.full.
Pang, Linyong, et al., "How GPU-Accelerated Simulation Enables Applied Deep Learning for Masks and Wafers," Photomask Japan 2019: XXVI Symposium on Photomask and Next-Generation Lithography Mask Technology, Apr. 16-18, 2019, 10 pages, SPIE, Yokohama, Japan.
Pang, Linyong, et al., "Making Digital Twins using the Deep Learning Kit (DLK)," Photomask Technology 2019, Sep. 15-19, 2019, 13 pages, SPIE, Monterey, California, USA.
PCT International Search Report and Written Opinion of Commonly Owned International Patent Application PCT/US2022/037648, mailing date Jan. 12, 2023, 12 pages, International Searching Authority (US).
Pradipta, Geraldo, et al., "A Machine Learning Based Parasitic Extraction Tool," Oct. 31, 2019, 3 pages, University of Minnesota, Minneapolis, Minnesota, USA.
Ren, Haoxing (Mark), "Machine Learning and Deep Learning Applications in Design Automation and Practical Issues," DAC '19: 56th Annual Design Automation Conference 2019, Jun. 2-6, 2019, 55 pages, Association for Computing Machinery, Las Vegas, Nevada, USA.
Ronneberger, Olaf, et al., "U-Net: Convolutional Networks for Biomedical Image Segmentation," May 18, 2015, 8 pages, retrieved from https://arxiv.org/pdf/1505.04597.pdf.
Shi, Xuelong, et al., "Physics based feature Vector Design: a Critical Step Towards Machine Learning based Inverse Lithography," SPIE Proceedings 11327, Optical Microlithography XXXIII, Mar. 23, 2020, 8 pages, vol. 113270A, SPIE, San Jose, California, USA.
Smith, Michael J. S., "Circuit Extraction and DRC," Application-Specific Integrated Circuits, Jun. 1997, 7 pages, Addison-Wesley Professional, Boston, Massachusetts, USA.

(56) References Cited

OTHER PUBLICATIONS

Sole, Marc Pons, "Layout Regularity for Design and Manufacturability," Doctoral Thesis, Jul. 8, 2012, 185 pages, Technical University of Catalonia, Barcelona, Spain.

Sperling, Ed, "Design Rule Complexity Rising," Semiconductor Engineering—Deep Insights for the Tech Industry, Apr. 19, 2018, 16 pages, SMG, retrieved from https://semiengineering.com/design-rule-complexity-rising/.

Teig, Steven L., "The X architecture: not your father's diagonal wiring," SLIP '02: Proceedings of the 2002 international workshop on System-level interconnect prediction, Apr. 6, 2002, 5 pages, ACM, retrieved from https://dl.acm.org/doi/10.1145/505348.505355.

Wang, Shibing, et al., "Efficient Full-Chip SRAF Placement Using Machine Learning for Best Accuracy and Improved Consistency," SPIE Proceedings 10587, Optical Microlithography XXXI, Mar. 20, 2018, 10 pages, vol. 105870N, SPIE, San Jose, California, USA.

Wang, Shibing, et al., "Machine Learning Assisted SRAF Placement for Full Chip," SPIE Proceedings 10451, Photomask Technology 2017, Oct. 16, 2017, 8 pages, vol. 104510D, SPIE, Monterey, California, USA.

Yang, Dingcheng, et al., "CNN-Cap: Effective Convolutional Neural Network Based Capacitance Models for Full-Chip Parasitic Extraction," Jul. 14, 2021, 9 pages, retrieved from https://arxiv.org/pdf/2107.06511.pdf.

Abouelyazid, Mohamed Saleh, et al., "Fast and Accurate Machine Learning Compact Models for Interconnect Parasitic Capacitances Considering Systematic Process Variations," IEEE Access, vol. 10, pp. 7533-7553, Jan. 12, 2022.

Author Unknown, "EM Solvers Theory Basics," May 30, 2017, 47 pages, FastFieldSolvers S.R.L., retrieved from https://www.fastfieldsolvers.com/Papers/EM_solvers_basics_170606.pptx.

Di Lorenzo, E., "The Maxwell Capacitance Matrix," Jun. 2020, 3 pages, FastFieldSolvers S.R.L., retrieved from https://www.fastfieldsolvers.com/Papers/The_Maxwell_Capacitance_Matrix_WP110301_R02.pdf.

Di Lorenzo, E., "The Treatment of Dielectrics in FasterCap," May 2013, 8 pages, FastFieldSolvers S.R.L., retrieved from https://www.fastfieldsolvers.com/Papers/The_Treatment_of_Dielectrics_in_FasterCap_WP130527_R01.pdf.

Abouelyazid, Mohamed Saleh, et al., "Accuracy-Based Hybrid Parasitic Capacitance Extraction Using Rule- Based, Neural-Networks, and Field-Solver Methods," IEEE Transactions on Computer-Aided Design of Integrated Circuits and Systems, vol. 41, No. 12, pp. 5681-5694, Mar. 21, 2022.

Peng, Shaoyi, et al., "Data-Driven Fast Electrostatics and TDDB Aging Analysis", 2020 IEEE/ACM 2nd Workshop on Machine Learning for CAD (MLCAD), Nov. 16-20, 2020, pp. 71-76, IEEE, Reykjavik, Iceland.

Sen, Padmanava, et al., "Neural-Network-Based Parasitic Modeling and Extraction Verification for RF/Millimeter-Wave Integrated Circuit Design," IEEE Transactions on Microwave Theory and Techniques, vol. 54, No. 6, Jun. 1, 2006, pp. 2604-2614, IEEE.

\* cited by examiner

COMPUTING PARASITIC VALUES FOR SEMICONDUCTOR DESIGNS

CROSS REFERENCE TO RELATED APPLICATIONS

The present application is related to the following applications having a similar specification and figures: U.S. patent application Ser. No. 17/871,893, filed Jul. 22, 2022, of which the present application is a continuation application; U.S. patent application Ser. No. 17/889,373, filed Aug. 16, 2022; and U.S. patent application Ser. No. 17/889,376, filed Aug. 16, 2022.

CLAIM OF BENEFIT TO PRIOR APPLICATIONS

This application is a continuation of U.S. patent application Ser. No. 17/871,893, filed Jul. 22, 2022, now published as U.S. Patent Publication 2023/0027655, which claims the benefit of U.S. Provisional Patent Application 63/203,455, filed Jul. 23, 2021, and which claims priority to International Patent Application PCT/US22/37648, filed Jul. 19, 2022, now published as International Publication WO2023003918. U.S. patent application Ser. No. 17/871,893, now published as U.S. Patent Publication 2023/0027655, U.S. Provisional Patent Application 63/203,455, and International Patent Application PCT/US22/37648, now published as International Publication WO2023003918, are incorporated herein by reference.

BACKGROUND

Three common types of charged particle beam lithography are unshaped (Gaussian) beam lithography, shaped charged particle beam lithography, and multi-beam lithography. In all types of charged particle beam lithography, charged particle beams shoot energy to a resist-coated surface to expose the resist.

In the production or manufacturing of semiconductor devices, such as integrated circuits, optical lithography may be used to fabricate the semiconductor devices. Optical lithography is a printing process in which a lithographic mask or photomask manufactured from a reticle is used to form patterns on a substrate such as a semiconductor or silicon wafer to create the integrated circuit. Other substrates could include flat panel displays or even other reticles. Also, extreme ultraviolet (EUV) or X-ray lithography are considered types of optical lithography. The reticle or multiple reticles may contain a circuit pattern corresponding to an individual layer of the integrated circuit, and this pattern can be imaged onto a certain area on the substrate that has been coated with a layer of radiation-sensitive material known as photoresist or resist. Once the patterned layer is created the layer may undergo various other processes such as etching, ion-implantation (doping), metallization, oxidation, and polishing. These processes are employed to finish an individual layer in the substrate. If several layers are required, then the whole process or variations thereof will be repeated for each new layer. Eventually, a combination of multiples of devices or integrated circuits will be present on the substrate. These integrated circuits may then be separated from one another by dicing or sawing and then may be mounted into individual packages. In the more general case, the patterns on the substrate may be used to define artifacts such as display pixels or magnetic recording heads.

In the production or manufacturing of semiconductor devices, such as integrated circuits, maskless direct write may also be used to fabricate the semiconductor devices. Maskless direct write is a printing process in which charged particle beam lithography is used to form patterns on a substrate such as a semiconductor or silicon wafer to create the integrated circuit. Other substrates could include flat panel displays, imprint masks for nano-imprinting, or even reticles. Desired patterns of a layer are written directly on the surface, which in this case is also the substrate. Once the patterned layer is created the layer may undergo various other processes such as etching, ion-implantation (doping), metallization, oxidation, and polishing. These processes are employed to finish an individual layer in the substrate. If several layers are required, then the whole process or variations thereof will be repeated for each new layer. Some of the layers may be written using optical lithography while others may be written using maskless direct write to fabricate the same substrate. Eventually, a combination of multiples of devices or integrated circuits will be present on the substrate. These integrated circuits are then separated from one another by dicing or sawing and then mounted into individual packages. In the more general case, the patterns on the surface may be used to define artifacts such as display pixels or magnetic recording heads.

Modeling parasitic effects in an IC design is very important. Parasitic effects refer to unwanted parasitic capacitance, resistance and inductance on the components (e.g., on wire segments) in the IC design. The different parasitic effects can impact circuit delay, energy consumption and power distribution. They can also introduce noise sources and other effects that impact reliability. To evaluate the effect of interconnect parasitics on circuit performance, they need to be accurately modeled.

Different techniques have evolved over time to model parasitics, including unwanted capacitance, resistance and inductance, as manufacturing techniques have become more complex. However, in recent years, the modeling and extraction of parasitics has become more difficult at smaller process geometries and newer process nodes. Many of the difficulties stem from the increasing effects of manufacturing process variations and other types of manufacturability issues at smaller geometries. The existing techniques are also relatively slow in computing the parasitic parameters.

BRIEF SUMMARY

Some embodiments provide a method for calculating parasitic parameters for a pattern to be manufactured on an integrated circuit (IC) substrate. The method receives a definition of a wire structure as input. The method rasterizes the wire structure (e.g., produces pixel-based definition of the wire structure) to produce several images. Before rasterizing the wire structure, the method in some embodiments decomposes the wire structure into several components (e.g., several wires, wire segments or wire structure portions), which it then individually rasterizes. The method then uses the images as inputs to a neural network, which then calculates parasitic parameters associated with the wire structure. In some embodiments, the parasitic parameters include unwanted parasitic capacitance effects exerted on the wire structure. Conjunctively, or alternatively, these parameters include unwanted parasitic resistance and/or inductance effects on the wire structure.

Some embodiments provide a method for training a neural network to extract parasitic capacitance from a semiconductor design. This method receives as input the semiconductor design that includes several wire structures. The method performs a rasterization operation that rasterizes each wire structure into several 2-D images. For each wire structure, the method uses these images as input to a machine trained network (e.g., a neural network) that generates one or more curvilinear shapes to represent the wire structure. The method then uses the set of the curvilinear shapes for each wire segments to train the neural network.

Some embodiments provide a method for calculating parasitic parameters for wire structures that are to be manufactured on a substrate of one or more semiconductor designs. The method in some embodiments receives a first wire structure that includes several rectilinear shapes associated with one or more semiconductor designs. The method generates, from the first wire structure, a second wire structure that includes several curvilinear shapes. In some embodiments, a rectilinear shape is a shape that is produced by using straight line segments (e.g., is a shape that only has straight line segments), while a curvilinear shape is a shape that is produced by at least one curved line segment (e.g., is a shape that has at least one curved line segment).

The method of some embodiments then uses the second wire structure to generate parasitic parameters for specifying parasitic effects experienced by one or more wire structures of the semiconductor design. The second wire structure in some embodiments is a structure that is predicted to be produced once the first wire structure is manufactured, and is thereby a predicted manufactured structure of the first wire structure.

The method in some embodiments generates the second wire structure by supplying the first wire structure to a machine-trained network (e.g., a neural network with a plurality of machine-trained neurons) to produce the second wire structure. The method in other embodiments uses a software simulator to generate the second wire structure as the predicted manufactured. The first and second wire structures in some embodiments include two-dimensional (2D) shapes (e.g., 2D curvilinear and rectilinear shapes).

The method receives a set of manufacturing process technology information (e.g., wire heights and dielectric thickness) associated with the semiconductor design and uses this information to produce three-dimensional (3-D) shapes (e.g., 3D curvilinear or rectilinear shapes respectively with curvilinear or rectilinear surfaces). The method then provides the produced 3-D shapes to a field solver to produce a set of parasitic parameters that it then uses to train the machine-trained network to produce parasitic values for different wire structures of different semiconductor designs.

In some embodiments, the parasitic values are parasitic coefficients. The method extracts, from a particular semiconductor design, a particular wire structure that includes the first wire and the set of neighboring wires. The method rasterizes the particular wire structure to produce a pixel-based definition of the particular wire structure, supplies the pixel-based definition to the machine-trained network (e.g., a neural network) to produce several parasitic coefficients relating to the parasitic effect on the first wire from the set of neighboring wires, and then uses the produced parasitic coefficients to compute a parasitic value that represents a parasitic effect on the first wire.

The parasitic coefficients in some embodiments include a parasitic coefficient associated with each of at least a subset of neighboring wires, with each neighboring wire's parasitic coefficient relating to a portion of the parasitic effect on the first wire that relates to the neighboring wire. In some embodiments, the parasitic coefficients are expressed in terms of unit length, and using the produced parasitic coefficients includes computing, for each particular neighboring wire, a particular overlap length that expresses a length of a segment of the first wire that is adjacent to a segment of the particular neighboring wire, and multiplying the computed particular overlap length for each particular neighboring wire by the parasitic coefficient associated with the particular neighboring wire. In some embodiments, the parasitic coefficients also includes a self-parasitic coefficient associated with the first wire.

In some embodiments, the machine-trained network produces a parasitic vector with several parasitic values. The method in some of these embodiments performs a post-processing operation to produce the parasitic coefficients from the parasitic vector. In some embodiments, the first wire and/or the neighboring wires include one or more curvilinear segments and one or more rectilinear segments. The method of some embodiments supplies a first wire structure that includes the first wire and the neighboring wires to a second machine-trained network (e.g., a neural network) to produce a second wire structure that includes the first wire and the neighboring wires. The first wire and the neighboring wires in the first wire structure only have rectilinear wire segments that are straight, while the first wire and at least a subset of the neighboring wires in the second wire structure have one or more curvilinear wire segments that are curved. In some embodiments, the rasterization operation is performed on the first wire structure before the first wire structure is supplied to the machine-trained network that produces the second wire structure.

The method of some embodiments calculates a parasitic effect of a set of neighboring wires on a first wire defined in a region of a semiconductor design. The method divides the region into several tiles so that different segments of first wire fall within different tiles and in different tiles the different first-wire segments have different subset of neighboring wire segments. The method performs a rasterization operation to produce a pixel-based definition for each tile, with each tile's pixel-based definition having a pixel-based representation of each wire segment in the tile.

The method supplies the pixel-based definition of each tile to a machine-trained network (e.g., a neural network with machine-trained neurons) to produce a tile-specific parasitic value representing a parasitic effect on the wire segment of the first wire that falls within the tile. The method computes, from the produced parasitic values, an overall parasitic value that represents an overall parasitic effect of the set of neighboring wires on the first wire. The method in some embodiments computes the overall parasitic value by computing a sum of the tile-specific parasitic values over all of the tiles that include a segment of the first wire.

The pixel-based representation of each wire segment in each tile includes a pixel-based representation of any segment of first wire that falls within the tile and any segment of a neighboring wire that falls within the tile. In some embodiments, the first wire and/or the neighboring wires include one or more curvilinear segments and one or more rectilinear segments. The method of some embodiments supplies a first wire structure that includes the first wire and the neighboring wires to a second machine-trained network (e.g., a neural network) to produce a second wire structure that includes the first wire and the neighboring wires. The first wire and the neighboring wires in the first wire structure only have rectilinear wire segments that are straight, while the first wire and at least a subset of the neighboring wires in the second wire structure have one or more curvilinear wire segments that are curved. In some embodiments, the rasterization operation is performed on the first wire structure before the first wire structure is supplied to the machine-trained network that produces the second wire structure.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Semiconductor wiring, more commonly called interconnect, forms a complex 3-D geometry that introduces unwanted parasitic capacitance, resistance and inductance. Dealing effectively with these unwanted parasitic effects is a process that typically takes circuit and mask designers multiple iterations in order to create manufacturable designs that meet specifications, yield well, and offer good reliability. Hence, in electronic design automation (EDA), there is a need to properly extract and model parasitic effects (e.g., unwanted capacitance, inductance and/or resistance effects) in the IC design accurately. Different techniques have evolved over time to model parasitics, including unwanted capacitance, resistance and inductance, as manufacturing techniques have become more complex.

This extraction/modeling step is becoming more and more difficult at smaller process geometries/newer process nodes. Many of the difficulties stem from the increasing effects of manufacturing process variations and other types of manufacturability issues at smaller geometries. Over the years, even though advances in processing technology have reduced the effect of resistance, and low-k dielectric materials have reduced the effect of capacitance, the parasitic effects have continued to remain dominant or have increased in dominance due to the continued scaling down of feature sizes (wire widths, etc.).

Figure 1:
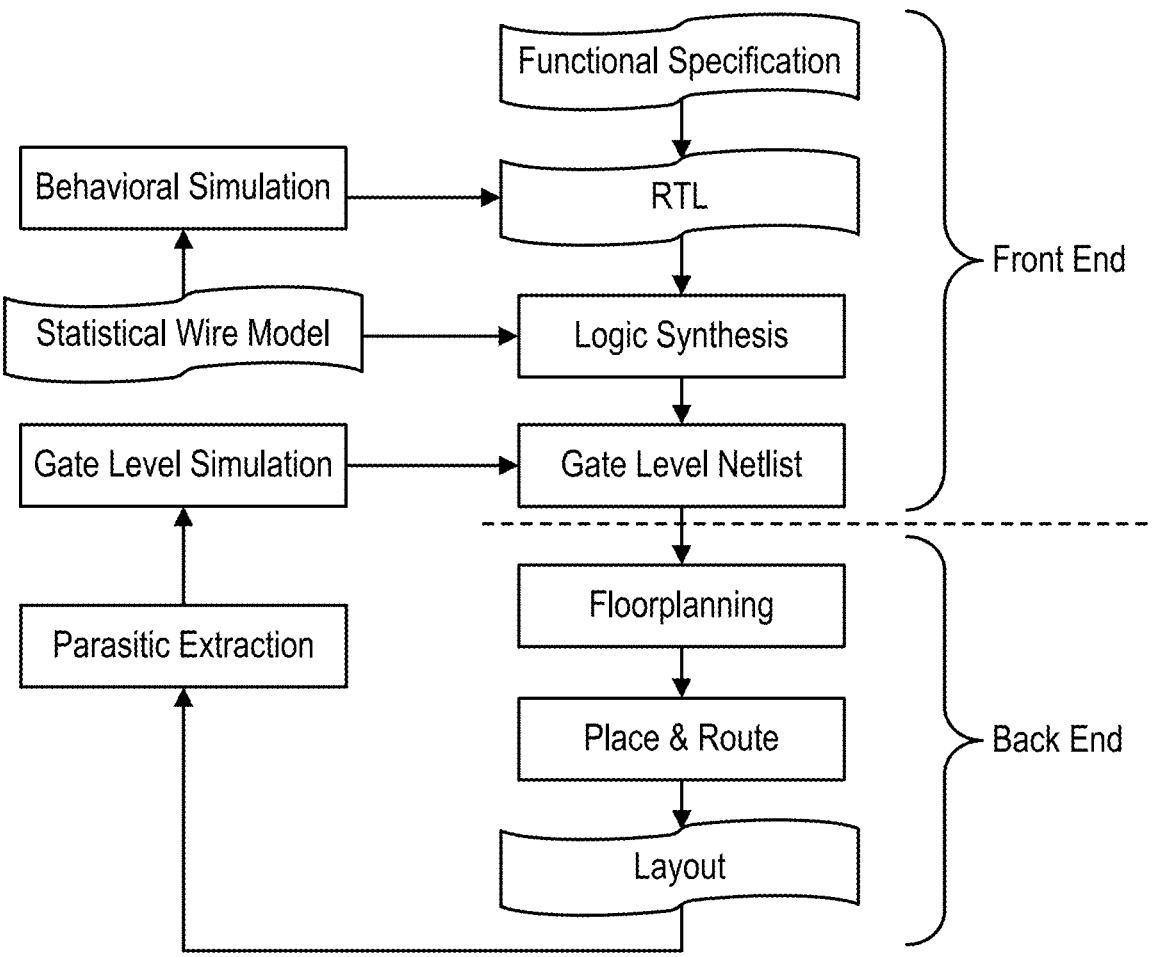
FIG. 1 illustrates a digital design flow, as known in the art.

The different parasitic effects can impact circuit delay, energy consumption and power distribution. They can also introduce noise sources and other effects that impact reliability. To evaluate the effect of interconnect parasitic effects on circuit performance, they need to be accurately modeled. FIG. 1 shows a simplified digital design flow used conventionally, in which parasitics are extracted from a circuit layout in a back end portion of the flow, and accounted for in gate level simulations in a front end portion of the flow. Typically, interconnect parasitics will affect delay/timing, leading to changes in the gate level netlist, requiring another iteration through floorplanning and/or place and route, and resulting with modified circuit layout. More complex digital design flows may replace the back end portion with other steps, such as virtual prototyping, power-grid synthesis, placement, power routing, clock tree synthesis (CTS), post-CTS optimization, routing, post-route timing and signal-integrity optimization, and finally signoff extraction, timing signal-integrity, and power sign off. Parasitics must also be accounted for in these additional design steps.

Analog design flows also require detailed simulations after the layout has been completed and parasitics have been extracted, with the parasitics affecting the simulation results in a way that requires a change of layout. More complex analog design flows also involve a form of layout prototyping, floorplanning, placement and routing, and attempt to account for layout-dependent effects (LDE) and density-gradient effects (DGE). In both analog and digital flows, routing needs to be aware of multiple-patterning, where pattern density is addressed by separating a layout into lower densities to be exposed separately, due to its impacts on printability. As in the digital flows, the various steps in analog design flows require that parasitics are accurately accounted for.

In both analog and digital flows, multiple iterations are typically required until a layout is achieved that meets timing, power, performance and area design constraints, in the presence of parasitics. Detailed simulations need to be repeated not only with nominal process condition parasitics, but also with parasitic variations representing the various manufacturing process corners, in order to ensure these circuit-level metrics are met across manufacturing process variations.

While the following description focuses primarily on capacitance extraction techniques, the methods described herein also apply to extraction of resistance and inductance.

Figure 2:
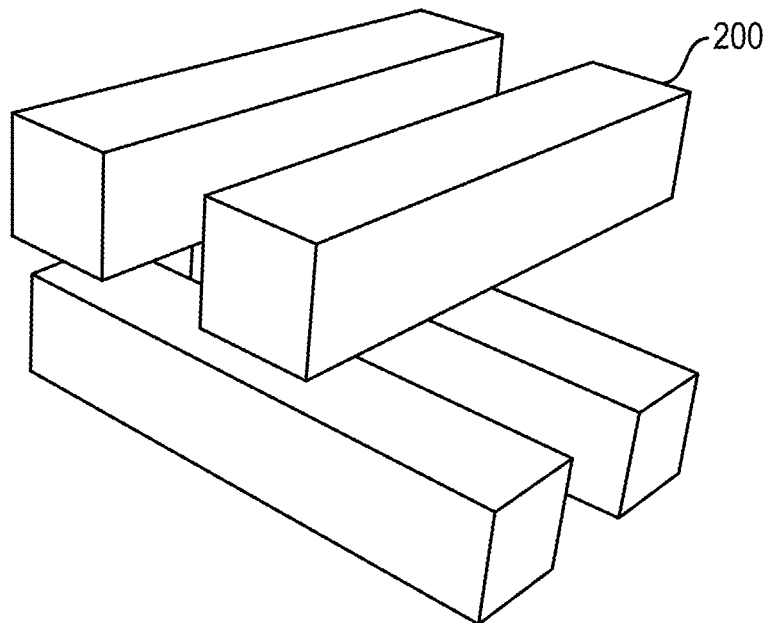
FIG. 2 illustrates an example bus structure, as known in the art.
Figure 2:
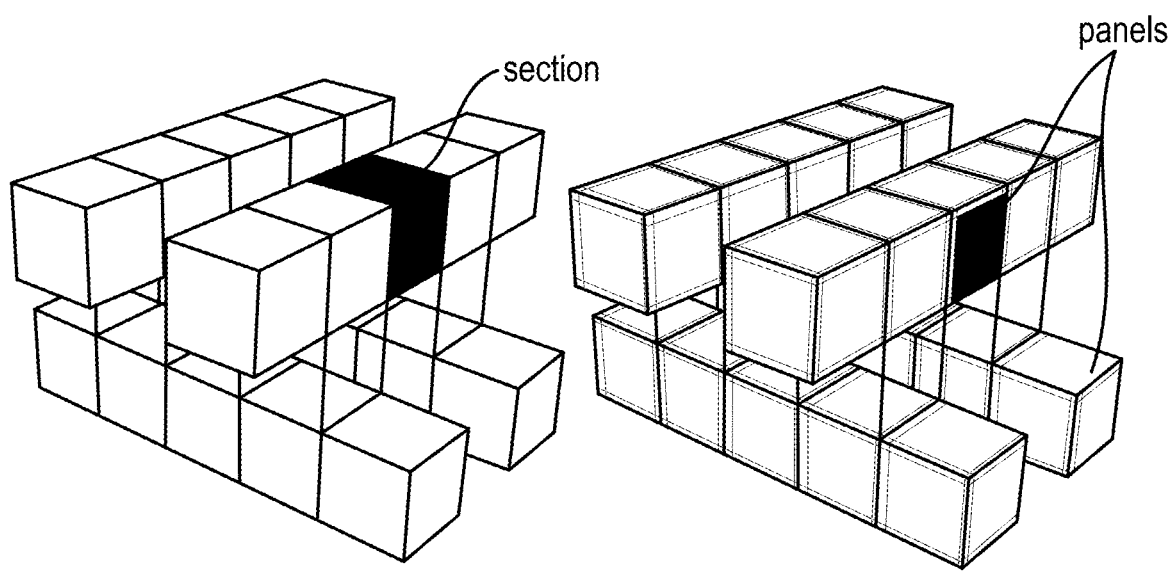

FastCAP is an existing three-dimensional capacitance extraction program that computes self and mutual capacitances between ideal conductors of arbitrary shapes, orientations, and sizes. FIG. 2 provides an example to illustrate the operation of such an extraction program. It illustrates a bus structure 200 for which its parasitic capacitance has to be extracted. As shown, the bus structure 200 includes four conductors each with six faces that are represented as patches. Conductors are broken into sections based on where they overlap. Input files for FastCap specify the discretization of conductor surfaces into panels, where edges are more finely meshed for accuracy. For the example in FIG. 2, FastCAP produces a 4×4 capacitance matrix, shown in the table below.

| CAPACITANCE MATRIX, picofarads | | | | |
|---|---|---|---|---|
| | 1 | 2 | 3 | 4 |
| 1% GROUP1 1 | 247.8 | −85.01 | −48.53 | −48.53 |
| 2% GROUP1 2 | −85.01 | 247.8 | −48.53 | −48.54 |
| 3% GROUP1 3 | −48.53 | −48.53 | 247.9 | −84.99 |
| 4% GROUP1 4 | −48.53 | −48.54 | −84.99 | 247.9 |

After solving the Maxwell's equations for the given structure, a symmetric capacitance matrix is then produced as output by the field solver, listing the conductor self-capacitances along the main diagonal, with the off-diagonal terms being the coupling capacitances among the various conductors.

Figure 3:
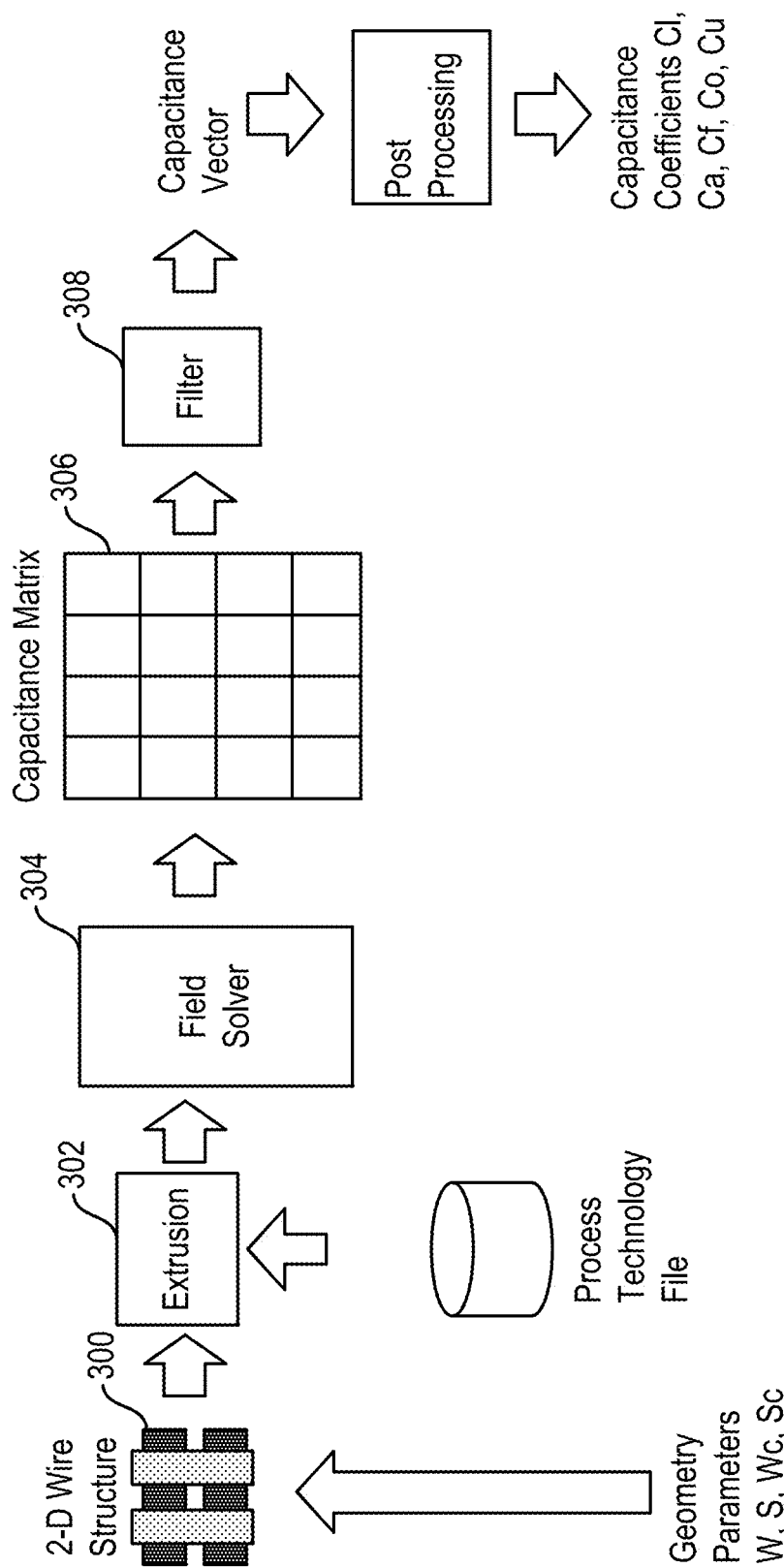
FIG. 3 illustrates a detailed flow to calculate parasitics, as known in the art.

Various methods may be used in technology pre-characterization in which several structures are simulated using a field solver, from which coupling capacitance coefficients are eventually computed. FIG. 3 illustrates that at a high-level a typical pre-characterization process starts by constructing several multi-layer 2-D circuit wire structures 300, containing conductor wires of various widths and spacings. These 2-D wire structures are then coupled with wire height information from a process technology file, and extruded (by an extrusion process 302) to form 3-D structures.

The 3-D structures are then converted into a form for the field solver 304 to process. For instance, the 3-D structures are converted into N conductors with a set of panels, which are then consumed by the field solver 304, which produces a N×N capacitance matrix 306. The capacitance matrix is filtered by a filter process 308 to produce a set of self-capacitance values and a set of coupling-capacitance values. These capacitance values are then post processed into component values, i.e., capacitance coefficients.

In a paper entitled "Analysis and Justification of a Simple, Practical 2½D Capacitance Extraction Methodology" by Cong et al., five foundations for a capacitance extraction methodology are presented.

The first foundation is that "ground, and neighboring wires on the same layer have significant shielding effects. Thus, both must be considered for accurate modeling."

The second foundation is that "coupling between wires in layer I+1 and wires on layer i−1 is negligible when the metal density on layer i exceeds a certain threshold."

The third is that "during capacitance extraction for wires on layer i, layers i+/−2 can be treated as ground planes with negligible error. There is no need to look beyond layers i+/−2."

The fourth is that "coupling analysis to wires in the same layer need only consider nearest neighbors independently, with the widths of same-layer neighbor wires having negligible effects on the coupling."

The fifth and final foundation is that "the joint interaction of layers i−1 and i+1 on layer i is negligible, therefore corrections for orthogonal crossovers and crossunders can be performed incrementally."

Figure 4A:
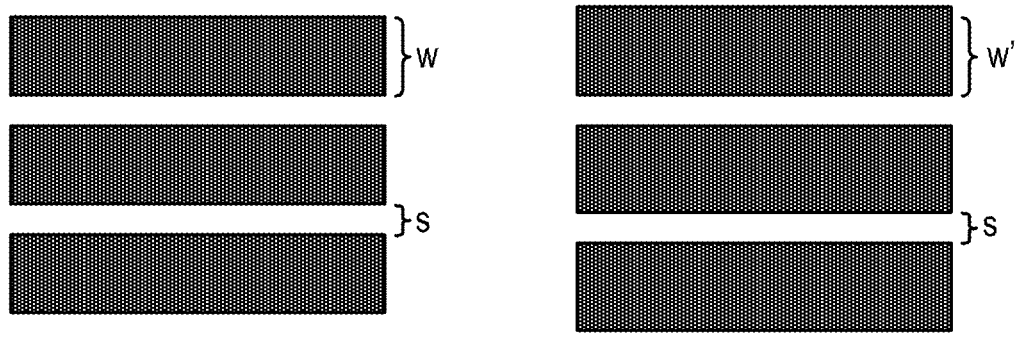
FIGS. 4A and 4B illustrate a wire structure, as known in the art.

These foundations as well as nomenclature from the above-mentioned paper are used in the parasitic extraction methodology of some embodiments of the invention. For example, FIG. 4A shows a single-layer structure allowing lateral (Cl), area (Ca) and fringe (Cf) capacitance coefficients to be extracted for a wire of width W, with same-layer neighbor spacing S, on layer i. The structure on the left shows three wires of identical width W, while the structure on the right shows three slightly different wires of identical width W' (W-prime), i.e., wires that are very slightly different in width from those of the structure on the left.

During pre-characterization, 2-D bus structures corresponding to both patterns are created. Wire heights from the process technology file are used to produce 3-D structures from the 2-D structures. The 3-D structures are then meshed to create a series of 2-D surface panels, and the panel information is used as input to the field solver. The 3-D structures are simulated by a field solver (e.g., FastCAP), resulting in two capacitance matrices. Simultaneous equations are constructed relating the capacitance matrix values to Cl, Ca and Cf capacitance component values, and solved to produce Cl, Ca and Cf component values for that particular wire width and spacing, i.e., W, S pair. The approach is then repeated for various values of W, S.

Figure 4B:
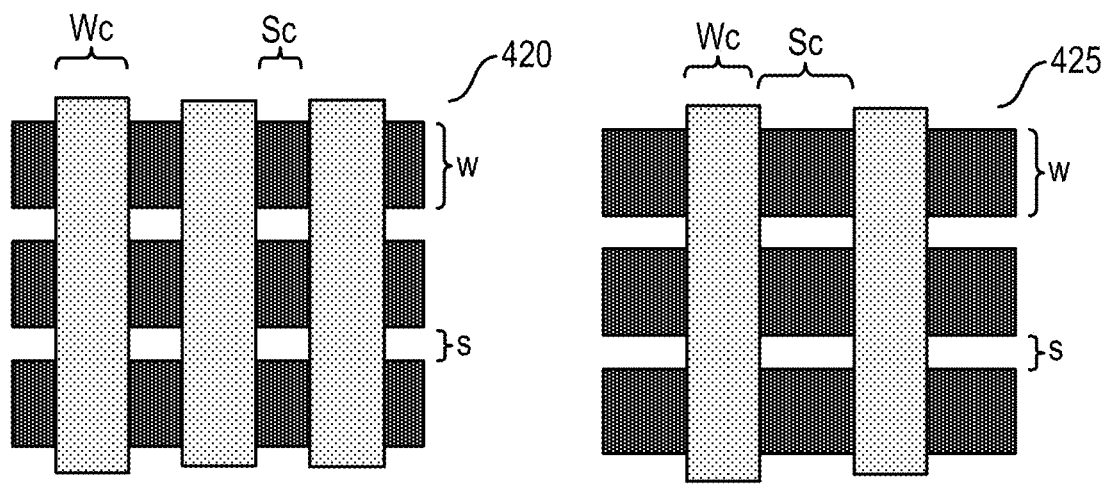

FIG. 4B shows a plan-view of the geometric structure for computing crossover capacitances. The left side of this figure contains a 3×3 bus crossing structure 420, and its right side includes a 3×2 bus crossing structure 425. Both structures are extruded to 3-D using the wire heights from a process technology file, and then converted to surface panels. The surface panel information is then used as input and solved (independently) by a field solver (FastCAP), which produces 3×3 and 3×2 capacitance matrices respectively. The resulting capacitance matrices are then post-processed to produce values for crossover capacitance.

Under this approach, the process is repeated with different values of crossover wire width and spacing Wc and Sc, along with different values of layer-of-interest width W and spacing S. The various capacitance matrices are then post-processed to allow for the crossover capacitance coefficient to be determined as a function of the 4-tuple (W, S, Wc, Sc). A similar approach is used to determine crossunder capacitance (using layer i−1 in lieu of layer i+1). Other approaches may use 3-layer bus crossing structure, or other structures, along with appropriate post-processing techniques to determine capacitance coefficients.

Using a variety of different values for W, S, Wc, Sc, a variety of values are then computed for Cl, Ca, Cf, crossover capacitance coefficient Co, and crossunder capacitance coefficient Cu. These values are then used to compute lookup tables, which allow for Cl, Ca, Cf, Co, Cu to be looked up during a later capacitance extraction phase, as a value of W, S, Wc, Sc. The lookup tables are stored as part of the pattern library for the extractor.

During the capacitance extraction phase, the geometric parameters for wire segments of an IC design of interest are determined, and the lookup tables in the pattern library are examined to find the capacitance component coefficient values. Linear interpolation in W, and 1/S is used when the values of the wires encountered during the capacitance extraction phase do not exactly match those used in the lookup table generation during the pre-characterization phase.

Note that this and other approaches have been related to geometric parameters. Models and tables are stored with the pattern library during pre-characterization as a function of geometric parameters, such as widths and spacings. During the extraction phase, a layout is decomposed to a set of geometric parameters (more widths and spacings), and the models/tables from the pre-characterization phase are consulted/looked up, with linear interpolation as necessary, to compute capacitance values.

To model the effects of parasitic capacitance over process generations, methods to calculate parasitic capacitance from layout data have evolved from 1-D, 2-D, 2.5-D and all the way to fully 3-D based solutions in order to meet the requisite accuracy.

Figure 5:
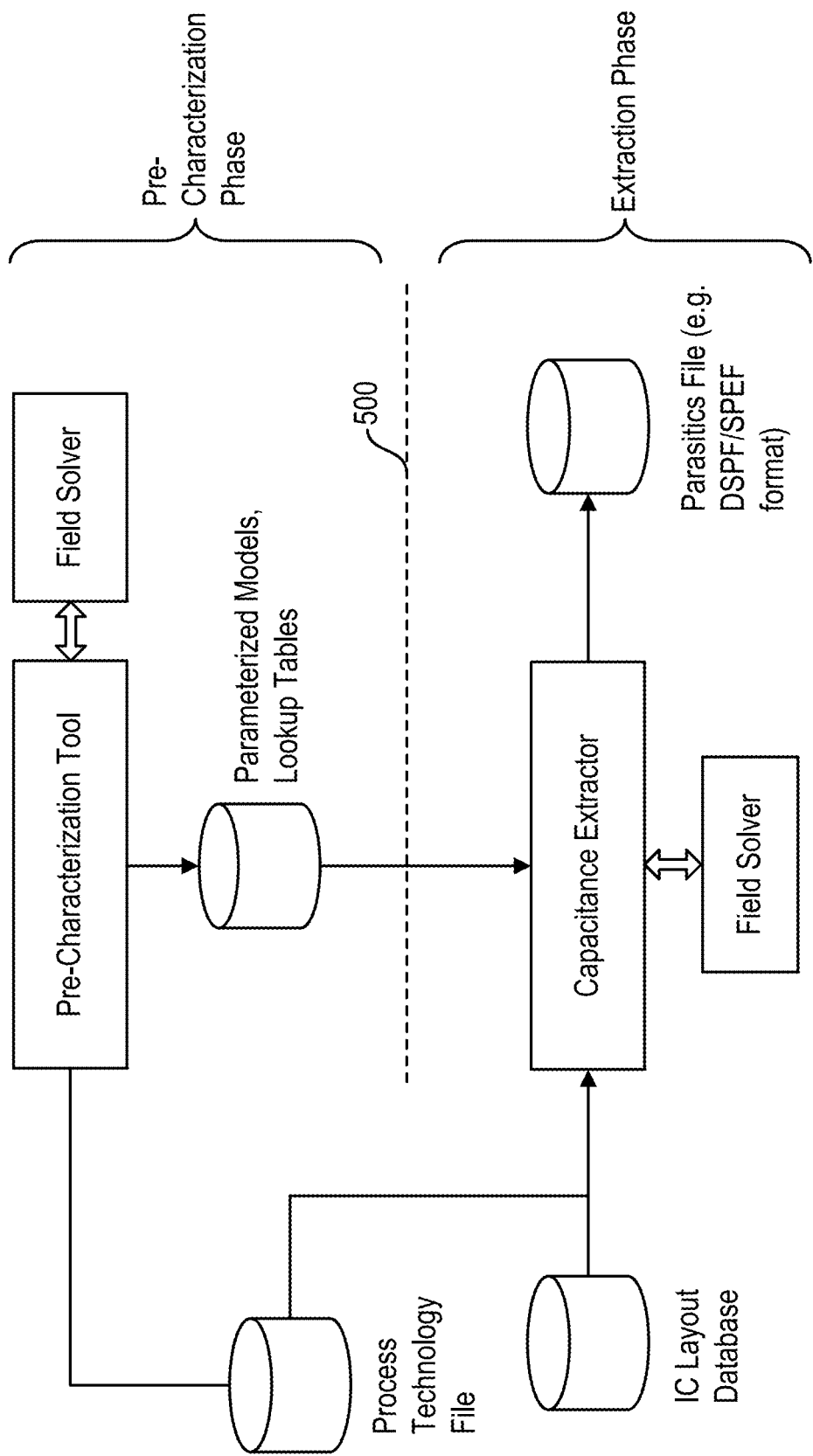
FIG. 5 illustrates a flow to calculate parasitics, as known in the art.

Regardless of accuracy level, capacitance extraction is generally performed in two phases. FIG. 5 illustrates a conventional flow for performing capacitance extraction. A first phase known as "pre-characterization" requires process technology information but does not require the layout for the actual IC to be extracted. This first phase is performed once per process technology node. This first phase is depicted above the dashed line 500 in FIG. 5. The second phase, called an extraction phase, requires an actual IC layout design database for the chip for which parasitic parameters are to be extracted, along with information produced during the pre-characterization phase. This phase is shown below the line 500 in FIG. 5. This phase is required once per IC design and produces a parasitics file or database as output.

During pre-characterization, CPU intensive but highly accurate field solvers are used to determine the capacitances for particular structures. The resulting capacitances are then post-processed in conjunction with particular capacitance models, resulting in various sets of model parameters or lookup tables representative of the manufacturing process technology. The models and/or lookup tables are then stored as the output of the pre-characterization phase. The parameterized models and/or lookup tables stored during the pre-characterization phase are then combined with geometry information regarding the IC design during the capacitance extraction phase.

A typical Reticle Enhancement Technology (RET) method has Optical Proximity Correction (OPC) verification to identify and correct hot spots. A hot spot is an area requiring ideal conditions to print properly and therefore is not resilient to manufacturing variation, or in some cases would not print properly even in ideal conditions. Hot spots lead to poor yield. Inverse Lithography Technology (ILT) is one type of OPC technique. ILT is a process in which a pattern to be formed on a reticle is directly computed from a pattern that is desired to be formed on a substrate such as a silicon wafer. This may include simulating the optical lithography process in the reverse direction, using the desired pattern on the substrate as input. ILT-computed reticle patterns may be purely curvilinear—i.e., completely non-rectilinear—and may include circular, nearly circular, annular, nearly annular, oval and/or nearly oval patterns. Numerous studies and wafer results have shown that ILT—in particular, unconstrained curvilinear ILT—can produce the best results in terms of wafer-pattern fidelity and process window.

In critical or very dense IC designs, it is essential to model the parasitic capacitance values as accurately as possible so that any effects on timing (performance) and power consumption are taken into accounted fully. Some embodiments achieve such capacitance extraction accuracy by incorporating manufacturing process simulators capable of producing curvilinear shapes, with proximity effects included, directly into both the pre-characterization and extraction phases of capacitance extraction.

Figure 6A:
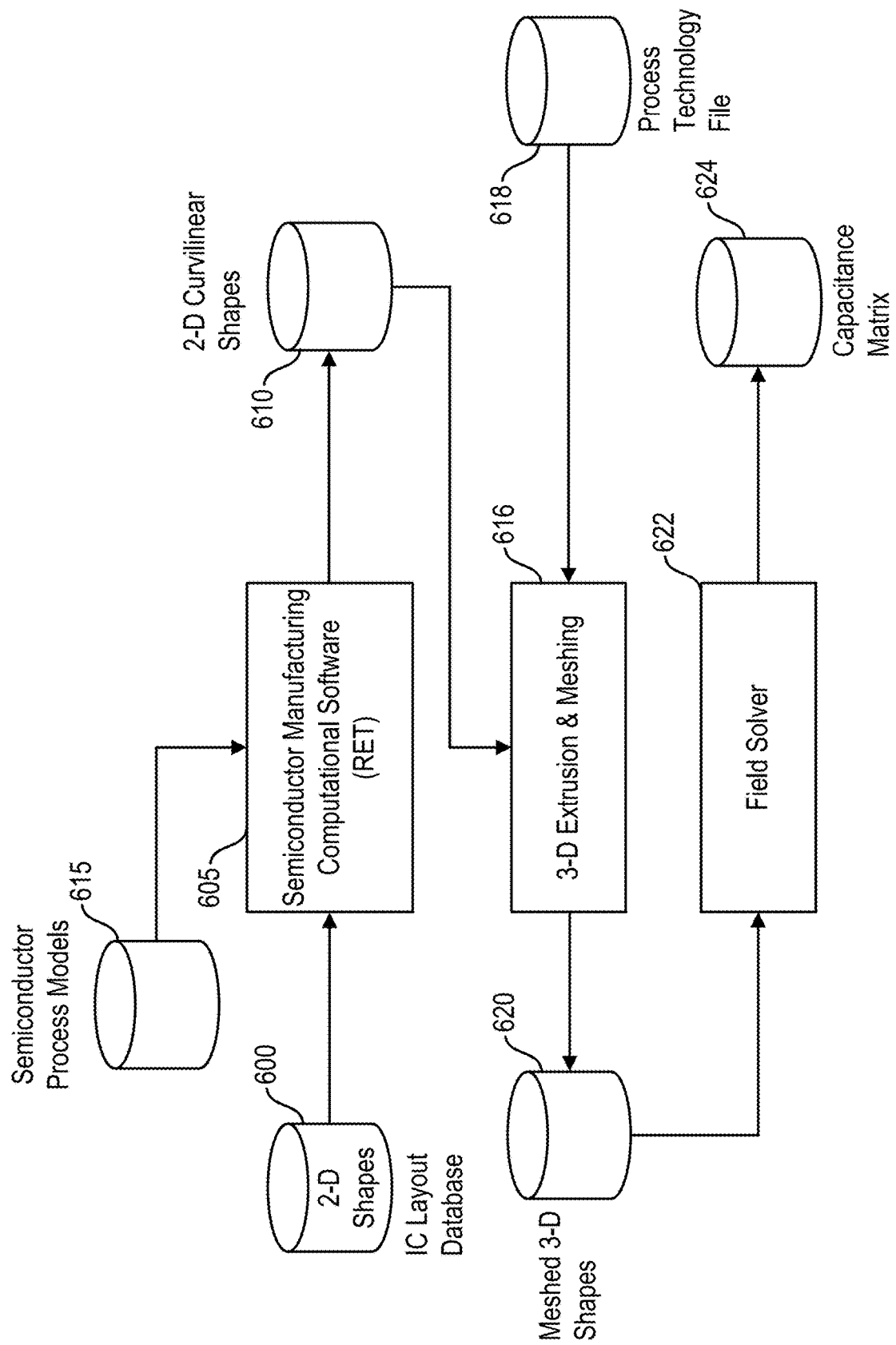
FIGS. 6A and 6B illustrate flows to calculate parasitics, in accordance with some embodiments.

Curvilinear shapes more closely resemble the manufactured shapes of components (e.g., wires) in the IC design. Hence, using curvilinear shapes to perform parasitic extraction improves the accuracy of the extracted parasitic values. FIG. 6A illustrates an example of a manufacturing process simulator that produces and uses curvilinear shapes during pre-characterization. The manufacturing process simulator in this example includes an RET 605 that produces curvilinear 2D shapes 610 from 2D shapes 600 using information from an IC layout database that informs how it should produce the curvilinear shapes 610. The manufacturing process simulator in this example also includes a semiconductor process model 615, which is a set of parameters that describe the semiconductor manufacturing process. This semiconductor process model 615 contains process models such as the type of light source used for lithography, the wavelength of the light used, etc.

The produced 2-D curvilinear shapes 610 are then fed to the 3-D extrusion and meshing process 616, which then uses these shapes and information from the process technology file 618 to produce precise meshed 3-D shapes 620. These 3-D shapes 620 are then provided as input to a field solver 622. The description of the 3-D shapes 620 is more accurate than what would be produced using traditional methods. This, in turn, results in significantly more accurate capacitance values 624 being produced by the field solver 622.

The manufacturing process simulators used in some embodiments simulate a variety of the detailed defects of manufacturing, allowing for detailed plan views of the shapes on silicon to be produced. These simulators can account for several proximity effects, line edge roughness, etc. Some embodiments combine the data produced by these simulators with the process technology file information for the technology stack in order to produce the 3-D models with high precision. These 3-D models are then used as input to the field solver tools to extract capacitances with the high level of accuracy.

In cases where run-time is not as critical, the manufacturing simulation tools can fully take manufacturing process variations and curvilinear design techniques into account, allowing for a more accurate determination of curvilinear interconnect variability to be made across process corners. However, given that run-time is often critical, some embodiments use newer and better capacitance extraction techniques that do not depend on traditional pattern libraries and traditional pattern matching, while accounting for the impact of process variations, and the increasing presence of curvilinear shapes in manufactured designs. These embodiments enable accurate parasitic extraction for both curvilinear design shapes and manufactured curvilinear interconnect shapes while taking process variations into account.

Traditional capacitance extraction approaches depend primarily on CPU based processing, using Single Instruction, Single Data stream (SISD) processing architectures. While it is possible to divide the pre-characterization and extraction problems into region-based sub-problems that can be solved in parallel using a multiple CPU approach, the calculations for the sub-problems themselves are still not as fine-grained as the problems which are typically solved on Graphics Processing Units (GPUs) with Single Instruction, Multiple Data (SIMD) architectures— for example graphics processing or deep learning applications. Hence, for traditional capacitance extraction approaches, a huge number of CPUs are required to realize significant performance benefits.

It is therefore desirable to map the capacitance extraction problem onto new SIMD architectures such as GPU or Tensor Processing Unit (TPU) devices in order to obtain a far more fine-grained level of parallelism, and to be able to solve capacitance extraction problems more efficiently. Some embodiments improve the speed of the parasitic pre-characterization and extraction by performing these operations in the pixel domain, which in turn allows for these operations to be performed by SIIVID architectures such as GPU or Tensor Processing Unit (TPU) devices. These embodiments use machine trained networks (e.g., neural networks) to process the pixel-based definitions of the IC design components (e.g., wire structures) analyzed during the pre-characterization and extraction.

For instance, the systems and methods of some embodiments determine capacitance values using a field solver, in which the input conductor structures used as input to the solver are curvilinear (e.g., in the plan view). Some embodiments produce these curvilinear shapes using a trained curvilinear shape prediction convolutional neural network (CNN). The systems and methods of some embodiments perform a technology pre-characterization that trains a capacitance prediction CNN, and then stores the capacitance prediction network structure and trained weights in a pattern library. Some embodiments provide systems and methods that train a multiple track capacitance prediction CNN during technology pre-characterization and then store the capacitance prediction CNN structure and trained weights in a pattern library.

The use of a trained, curvilinear shape prediction CNN allows some embodiments to produce precise representations of 3-D manufactured curvilinear conductor shapes quickly at extraction time. These 3-D manufactured curvilinear conductor shapes are then provided as input to a field solver. This approach improves the accuracy of critical net extraction, and particularly the accuracy of critical net extraction in the presence of significant manufacturing process variations.

Some embodiments use a deep learning technique, instead of geometrical approaches, in order to perform capacitance coefficient modeling in pattern-based extraction for non-critical nets. For instance, in some embodiments, a capacitance component prediction CNN architecture is used to predict capacitance or capacitance coefficient values by using 2-D rasterized images of conductor structures as input, instead of geometrical parameters as input. As such, certain limitations of model-based or table-based approaches (such as used in 2.5D and 3-D pattern matching techniques) are removed. This, in turn, expands the applicability and range of pattern based techniques.

Some embodiments perform full capacitance extraction by using trained CNNs, instead of using traditional pattern matching or field solvers for parasitic extraction. For instance, in some embodiments, the design to be extracted is rasterized to the pixel domain, and split into image tiles. The capacitances for the conductors represented as pixels within each tile are rapidly inferred by a trained capacitance prediction CNN and integrated over the tiles associated with a given conductor to obtain final capacitance values. The embodiments that use neural networks can be executed quickly as they can be efficiently processed by the SIIVID underlying architectures of today's GPU and TPU devices.

Figure 6B:
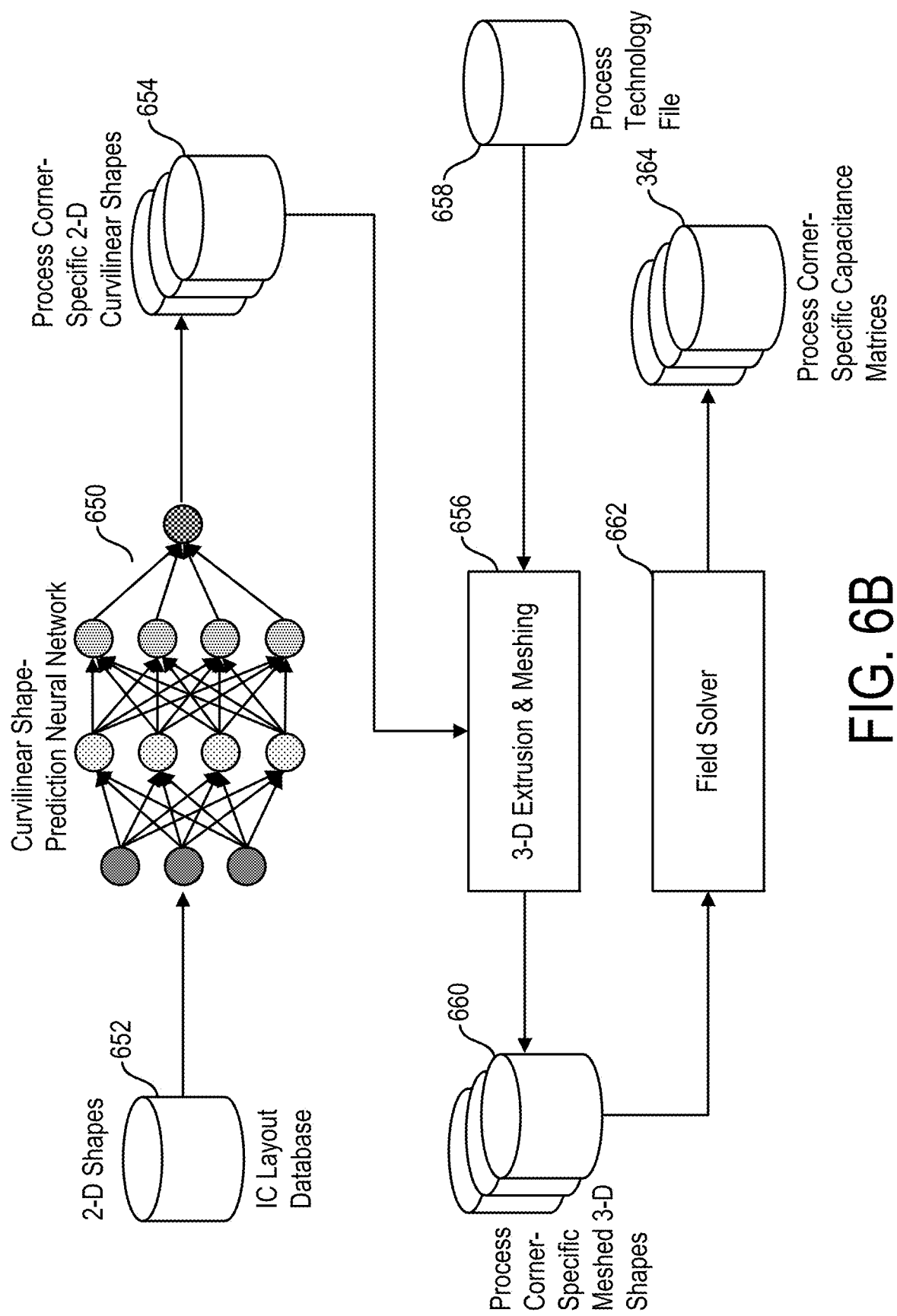

FIG. 6B illustrates using a trained curvilinear shape-prediction neural network 650 in a capacitance extraction flow to produce highly accurate parasitic capacitance values for the curvilinear conductors that will result after using an IC design to manufacture an IC. The neural network 650 is trained to produce several 2-D curvilinear shapes 654 for several manufacturing process variations for 2-D shapes 652 that are defined after an EDA stage (e.g., after routing). In some embodiments, the neural network processes pixel definition of the 2-D shapes 652 and produces the curvilinear 2-D shapes 654 in the pixel domain. Accordingly, for the neural network, the input 2-D shapes 652 are rasterized into the pixel domain.

As shown in FIG. 6B, the produced 2-D curvilinear shapes 654 for the manufacturing process variations are then fed to the 3-D extrusion and meshing process 656, which then uses these shapes and information from the process technology file 658 to produce precise meshed 3-D shapes 660 (as defined by 3D surface descriptions). To perform the extrusion, the definition of the 2-D curvilinear shapes is transformed from the pixel domain to the geometric contour domain in which shapes are defined by the definition of their contours.

These 3-D shapes 660 are then provided as input to a field solver 662. The description of the 3-D shapes 660 is far more accurate than what would be produced using traditional methods. This, in turn, results in significantly more accurate capacitance values 364 being produced by the field solver 662.

Instead of just running one neural network 650 to produce several 2-D curvilinear shapes 654 for several manufacturing process variations, other embodiments use several single-output neural networks run in parallel, each for a different manufacturing process variation. These concurrently executed neural networks produce several process corner-specific 2-D wafer contours for several process variations. In some embodiments, each such neural network uses a pre-determined set of weights corresponding to one manufacturing process variation.

On the other hand, the neural network 650 that produces several 2-D curvilinear shapes 654 for several manufacturing process variations, takes as input a set of IC layout drawn shapes but produce not one but multiple outputs of curvilinear shapes, one per process manufacturing corner. Examples of multiple 2-D curvilinear shapes for multiple manufacturing process variations (produced by one neural network 650 or multiple single process-variation networks) include a mean curvilinear image, a maximum curvilinear image, and a minimum curvilinear image, corresponding to different extremes in the processing conditions.

Details on these examples and on how curvilinear shape-prediction neural networks can be trained and subsequently used to produce detailed 2-D images of curvilinear silicon wafer shapes, given raster images derived from IC designs as input are disclosed in "Methods and Systems to Determine Shapes for Semiconductor or Flat Panel Display Fabrication," U.S. Application Publication 2022/0128899, and U.S. Provisional Application 63/283,520, filed Nov. 28, 2021, both of which are incorporated herein by reference.

As mentioned above, the 2-D curvilinear shapes 654 over the process variations are extruded and meshed in parallel by the 3-D extrusion and meshing process 656, to form a set of corner-specific or extreme-specific 3-D surface meshed volumes 660, which are then input to the field solver 662. The field solver is just one field solver in some embodiments, while it is multiple field solvers in other embodiments. The field solving operation performed by the field solver(s) produces a corresponding set of parasitic capacitance values (e.g., a set of matrix values) over the manufacturing process variation. In some embodiments, the parasitic capacitance values are filtered and converted into DSPF/SPEF files (Detailed Standard Parasitic Format/Standard Parasitic Exchange Format), or other industry standard parasitic representations, such as the Synopsys Galaxy Parasitic Database (GPD).

The modifications to the curvature due to the various manufacturing process variation are thus accurately captured in the solver-produced capacitance values for the various process corners. For each 2-D shape in the IC design being analyzed, the above-described embodiments compute multiple 2-D curvilinear shapes over multiple process variations. However, other embodiments use the flow and neural network illustrated in FIG. 6B, to generate 2-D and 3-D curvilinear shapes for just one process condition (one specific manufacturing process variation), and hence just produce parasitic capacitance values for this one process condition.

Figure 7:
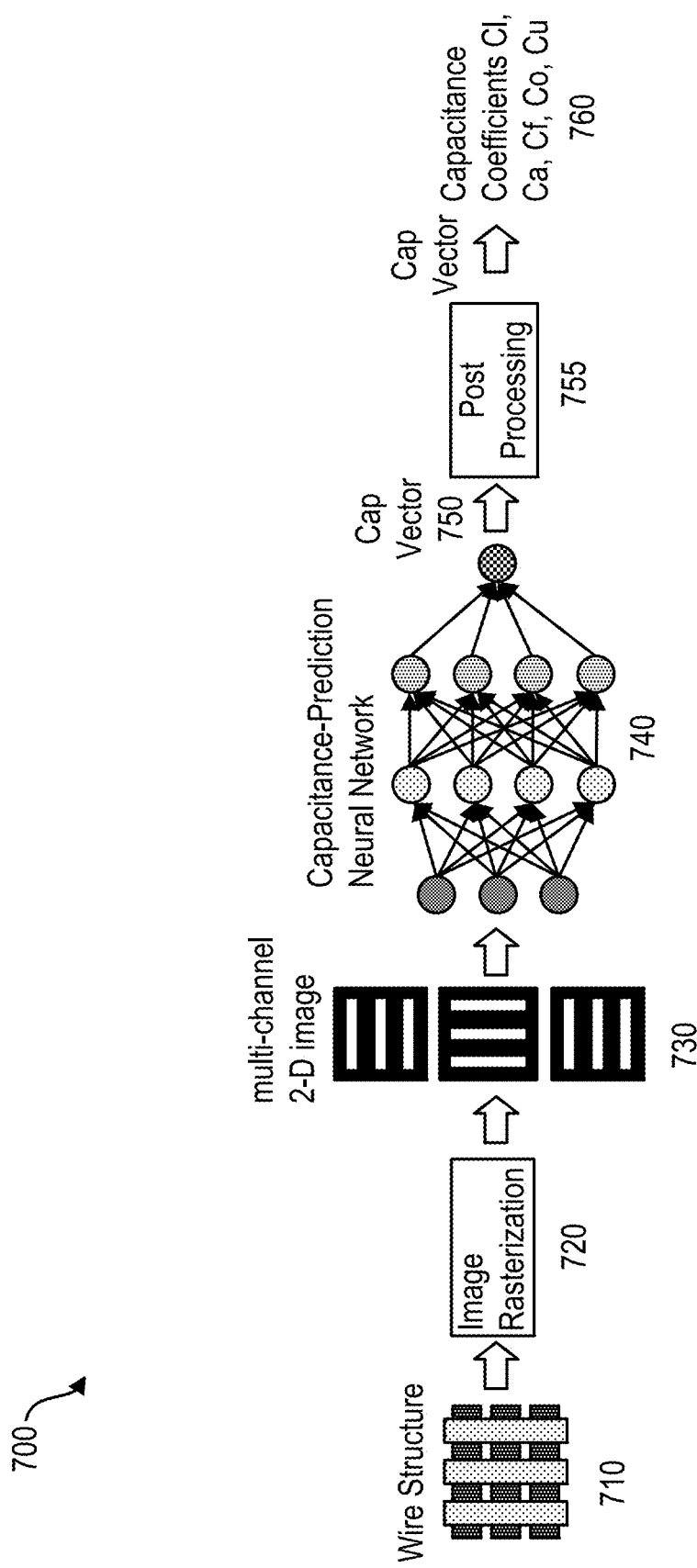
FIG. 7 illustrates a flow to calculate parasitics, in accordance with some embodiments.

FIG. 7 illustrates a novel non-geometrical approach 700 to replace or complement the geometrical approach for computing capacitance coefficients during a pre-characterization process that produces capacitance coefficients for later use during extraction. The geometrical approaches take a piece of layout and reduce it to geometric features, such as wire length, spacings, etc., as mentioned above by reference to FIG. 4.

On the other hand, during technology pre-characterization, the approach illustrated in FIG. 7 replaces the simplistic capacitance models/lookup tables with a trained capacitance prediction neural network 740, which is a more universal function approximator. Under this approach, image rasterization 720 is performed on a wire structure 710 to produce several 2-D images, which are referred to below as a multi-channel 2-D image 730. The image rasterization 720 defines the multi-channel 2-D image 730 in the pixel domain (i.e., produces a pixel-based definition for the multi-channel 2-D image 730). So, instead of quantifying geometrical attributes and then using these attributes along with pre-characterized lookup table values to compute capacitances, the approach illustrated in FIG. 7 uses pixel representations of the design to produce capacitance coefficients from which parasitic capacitances are computed (e.g., after multiplying the coefficients by wire segment lengths and/or wire segment overlapping lengths).

In some embodiments, the image rasterization produces white pixels for fully-filled pixels (e.g., pixels fully covered by a shape, such as wire segments), black pixels for fully-empty pixels (e.g., pixels not covering any shapes, such as wire segments), and grey pixels for partially-filled pixels. In some of these embodiments, fully-filled pixels are represented with the numerical value 1.0, fully-empty pixels are represented as 0.0, and partially-filled pixels are represented with a value in the range [0,1] representative of the area of the pixel which is filled by the wire (e.g., a pixel that is 50% filled will have a value of 0.5). Before rasterizing the wire structure, some embodiments decompose the wire structure into several components (e.g., several wires, wire segments or wire structure portions), which it then individually rasterizes.

The multi-channel 2-D image 730 is then used as the primary input to the capacitance-predicting neural network 740, which produces a capacitance vector 750. In some embodiments, the capacitance vector values 750 produced by the trained capacitance neural network 740 are further post-processed into capacitance coefficients. To this end, the capacitance vector 750 is supplied to a post-processor 755, which produces capacitance coefficients 760 as output. As shown, these capacitance coefficients include Cl, Ca, Cf, Co, Cu in some embodiments, while in other embodiments they are post processed into other coefficients for other capacitance models.

To produce the capacitance coefficients 760, the post-processor 755 in some embodiments constructs simultaneous equations relating the capacitance matrix values to Cl, Ca and Cf capacitance component values, and solves this equations to produce Cl, Ca and Cf component values for that particular wire width and spacing, i.e., W, S pair. The approach is then repeated for various values of W, S. In some embodiments, the produced capacitance coefficients 760 are parasitic unit lengths. Hence, during extraction, the produced capacitance coefficients 760 are then used to compute parasitic capacitances, for example, by multiplying these coefficients with length of overlapping wire segments.

Using the trained neural network 740 as the mapping mechanism is advantageous as during extraction phase, it removes the need for externally performed linear interpolation when wire widths and spacings are different from those used during training time. This is because neural networks, when appropriately designed and trained, act as universal function approximators, and removes the need for such external interpolation when operating on previously unseen data. Another advantage of this method over conventional approaches is that the multi-channel 2-D image 730 that is input into the neural network 740 may represent arbitrary conductor shapes, including curvilinear shapes.

For example, in some embodiments, one or more of the wire structures are generated from curvilinear shapes, by a second neural network that is trained for shape prediction (e.g., the curvilinear shape-prediction neural network of FIG. 6B). In some embodiments, the input semiconductor design includes several wire structures. Each of these wire structures is rasterized, and curvilinear shapes are calculated from each rasterized wire structure. The rasterizing of each wire structure can produce several images, e.g., with each image in some embodiments corresponding to one layer's of wiring in the wire structure. The produced curvilinear wire structures can include multiple wire tracks that cross each other, and can be sub-segmented into smaller structures. Before rasterizing each wire structure, some embodiments decompose the wire structure into several components (e.g., several wires, wire segments or wire structure portions), which it then individually rasterizes.

In FIG. 7, the neural network output (i.e., the capacitance vector 750) in some embodiments represents a vector of capacitance values for a geometric structure. Input wire structure 710 may be rasterized into multi-channel 2-D image 730 representing three conductors each on a layer i of interest, a crossover layer i+1 above, and a cross-under layer i−1 below. During rasterization 720, the wire structure is rasterized onto the multi-channel 2-D image 730. In some embodiments, the different image channels represent different interconnect layers of an IC manufacturing process.

Figure 16:
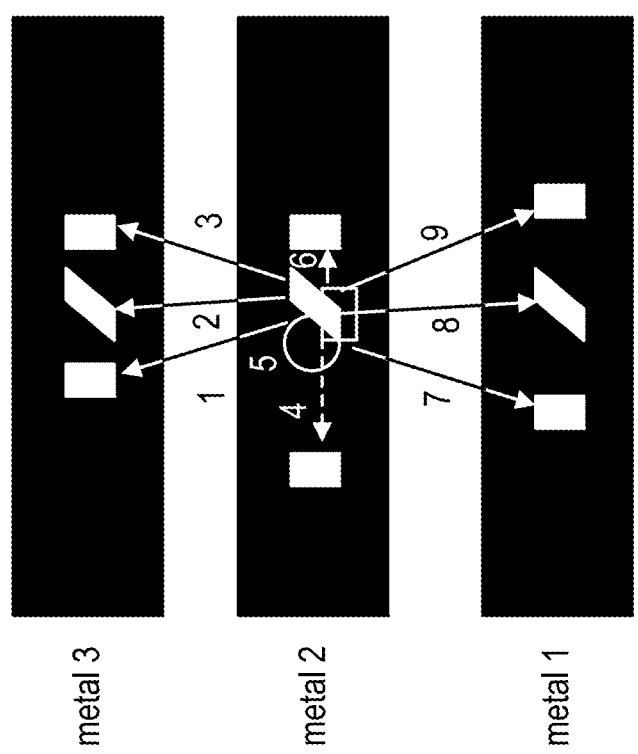
FIG. 16 illustrates a capacitance matrix for a 3×3 bus structure, in accordance with some embodiments.

For a 3×3 bus crossing structure, 9 nine capacitances are of interest as shown in FIG. 16, which are a self-capacitance for a central conductor segment 5 in a central layer i ("metal 2"), along with eight capacitance values to this segments eight nearby neighbors. These neighbors include (1) lateral capacitances from the central conductor to its left and right neighbor segments 4 and 6 on the central layer i, (2) three crossover capacitances from the central conductor segment 5 on the central layer i to three conductor segments 1, 2, and 3 on layer i+1 (i.e., the layer above, "metal 3"), and (3) three cross-under capacitances from the central conductor segment 5 on the central layer i to three conductor segments 7, 8 and 9 on layer i−1 (i.e., the layer below, "metal 1").

To train the neural network 740, some embodiments use known input sets (e.g., known wire structures) with known output sets (e.g., known capacitance coefficients). To produce these known input/output sets, some embodiments use a field solver approach that will be described below by reference to FIG. 9. During training, groups of known input sets are rasterized and fed through the neural network 740 and post-processed (as shown in FIG. 7) to produce groups of output sets. The difference between each produced group of output sets and the known output sets of each group of known input sets is an error value that is propagated back through the neural network 740 to train its trainable parameters (e.g., its weight values). Some embodiments perform the training once per process technology, and then perform the operations of FIG. 7 to perform the extraction once or more than once during the IC design.

Figure 8:
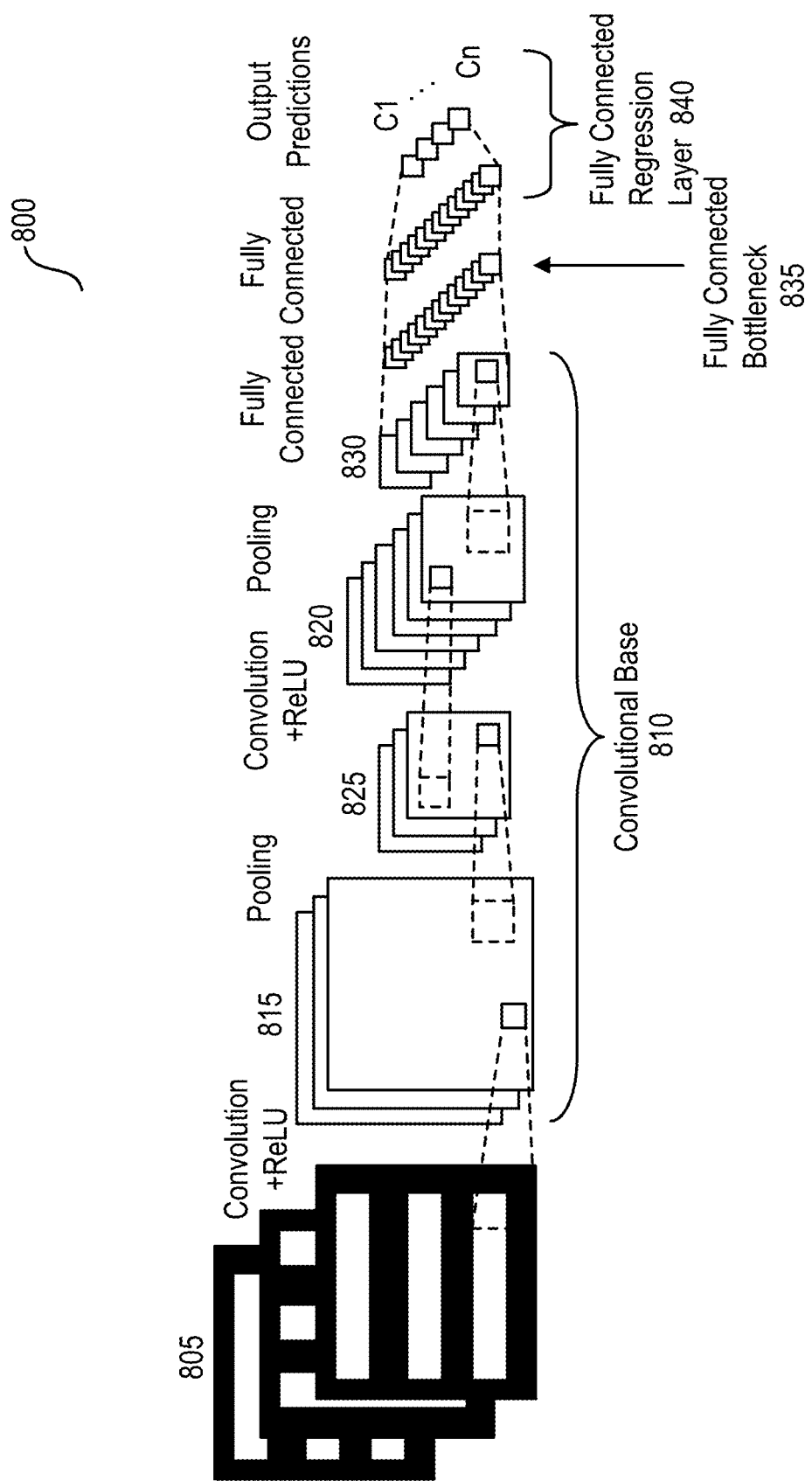
FIG. 8 illustrates a neural network architecture, in accordance with some embodiments.

In other embodiments, the capacitance-prediction neural network may be trained to directly output the capacitance coefficient values themselves, e.g., the outputs may be capacitance coefficients (Cl, Ca, Cf, Co, Cu). With this approach, the post-processing step itself is also learned by the neural network. FIG. 8 shows the architecture of a CNN 800 of some embodiments that can be used to directly output the capacitance coefficient values.

In this figure, a 3-channel input image 805 is processed by a convolutional base 810, that includes two pairs of convolution layers 815 and 820 (e.g., with 5×5 kernels each). Each of the convolution layers has a subsequent 2D max pooling 825 or 830 to down sample the images. Each convolutional layer uses a filter depth of 32. Input image dimensions are 60×60 pixels, with each pixel representing a 10 nm square of IC design data. Hence, each image represents a 600×600 nm area of the IC design.

In the neural network model, the convolutional base 810 is followed by a 16-neuron-wide fully-connected bottleneck layer 835, which serves to reduce the overall number of model parameters. The output from this narrow layer is then fed to a regression network 840, which includes a 100-neuron-wide fully-connected layer followed by a 9-neuron fully-connected output layer.

All layers with the exception of the final output layer use ReLU activation, and all convolutional layers use zero-padding to ensure the output image size is the same as the input image size. Since this is a regression CNN application, the final output layer uses a linear activation function. The final output layer is as wide as the number of capacitances N, to be predicted. Once training is complete, a set of trained weights for each process technology in some embodiments is preserved for use in a neural network, such as capacitance-prediction neural network 740. In other embodiments, the final output layer is as wide as the number of capacitance coefficients to be predicted. One of ordinary skill in the art will understand that other embodiments use neural network structures different than the structure illustrated in FIG. 8 to produce parasitic values.

To train the CNN 800 or another neural network to produce parasitic values, some embodiments use training data set with known inputs and output values. These embodiments iteratively (1) feed sets of known input values successively through to the neural network to produce sets of output values, (2) compute an error value between each set of produced output values and the known output values corresponding to the input values, and (3) back propagate each computer error value through the neural network in order to adjust the configurable parameters of the neural network (e.g., its weight values) to reflect the knowledge gained through the training.

Figure 9:
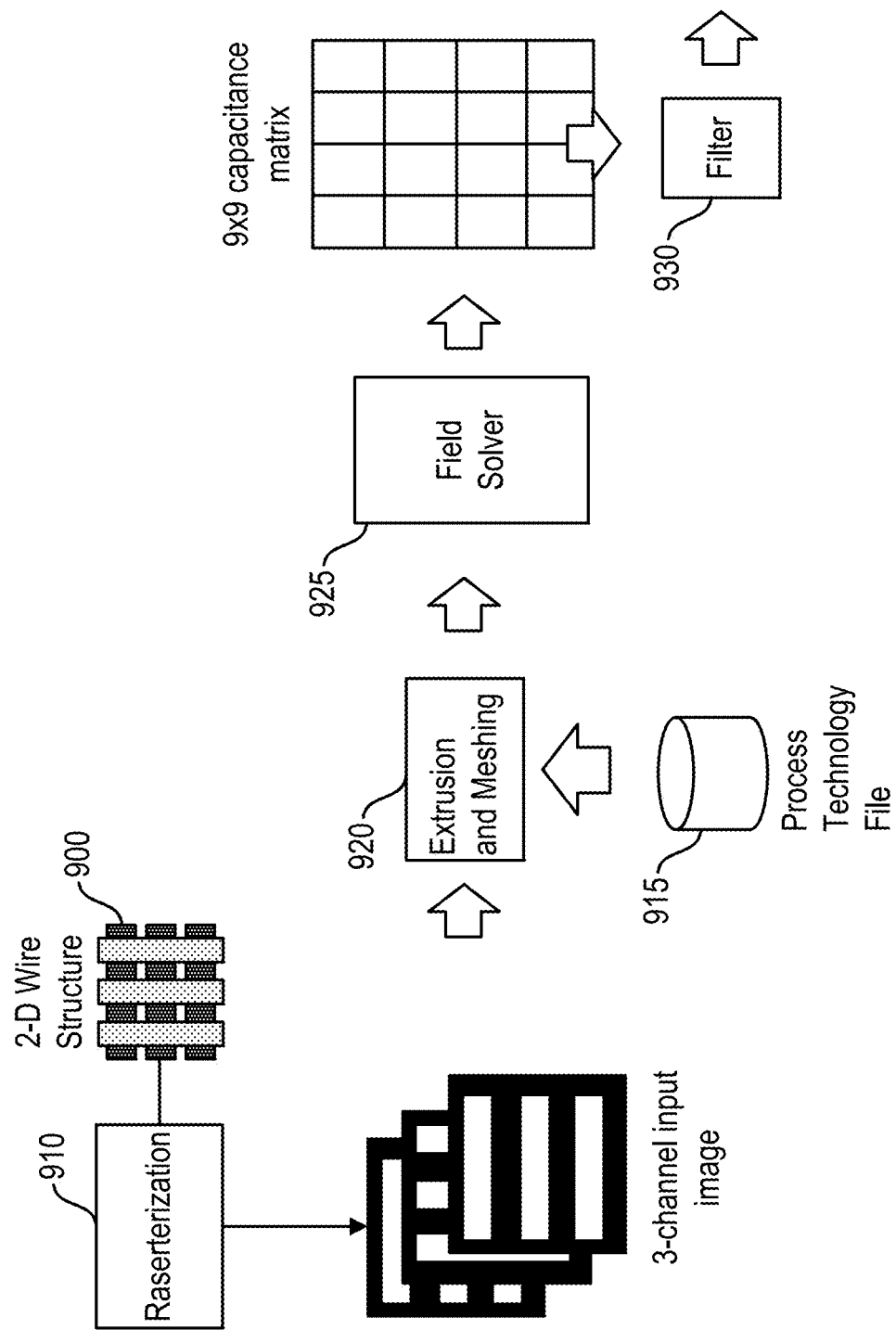
FIG. 9 illustrates training data generation, in according with some embodiments.

FIG. 9 represents a data flow diagram for creating the training data set (X and Y data) necessary for training a neural network, e.g., a 3×3 bus crossing structure. The X training data represents a rasterized wire structure input, while Y training data represents a capacitance vector output. In this example, several 3-layer, 2-D rectangular wire crossing structures 900 are generated with different wire widths and spacings. Some embodiments use different wire widths down to a minimum of 30 nm, with a unit wire length of 90 nm. Spacings of up to 4 routing tracks wide are also used, as spacings beyond this are commonly assumed to lead to relatively inconsequential changes in capacitance values.

An image rasterizer 910 performs a rasterization operation on each wiring structure 900 to produce a 2-D image that is defined in the pixel domain for the wiring structure. Each 2-D image has 3 channels each containing a 2-D rasterized image representing a layer i with a first preferred routing direction (e.g., vertical), and the layers above and below with orthogonal second preferred routing directions (e.g., horizontal). In some embodiment, a pixel size of 10 nm is used during rasterization so that, for example, a 30 nm-wide wire is rendered as 3 pixels wide in the image. Fully-filled pixels are represented with the numerical value 1.0, fully-empty pixels are represented as 0.0, and partially-filled pixels are represented with a value in the range [0,1] representative of the area of the pixel which is filled by the wire (e.g., a pixel that is 50% filled will have a value of 0.5).

Each wire-crossing structure rasterized in this manner for input to the neural network is then fed to an extrusion and mesh modeling process 920, which produces a 3-D representation of the structure. As mentioned above, to perform the extrusion operation that uses the contour definition of shapes, some embodiments convert the definition of the 2-D curvilinear shapes from the pixel domain to the geometric contour domain in which shapes are defined by the definition of their contours.

The produced 3-D representations are suitable for input to a field solver 925. To create the field solver input representation, the extrusion and mesh modeling process 920 uses the 2-D wire dimensions from the wire structure with the various layer-specific wire heights and dielectric thickness as specified in the process technology file 915 for the manufacturing process. This allows the 2-D wire shapes to be extruded in the 'height' dimension forming 3-D volumes. The set of process technology information in the process technology file can include wire heights and dielectric information, for example.

For each of the resultant 3-D interconnect volumes, some embodiments compute the surface panels. In some embodiments, these panels are simply computed as rectangles. In more complex embodiments, these panels are computed by applying a more complex meshing algorithm before extrusion, for example as described above with respect to computing curvilinear 3-D interconnect shapes. For instance, some embodiments produce triangular or quadrilateral meshes. Ground planes are then inserted above and below the top and bottom layers.

The 3-D surface panel representations, including added ground planes above and below the layer of interest, are then solved by the field solver 925, producing an N×N capacitance matrix, where N is the total number of conductors. For a 3×3 bus crossing structure, there is a total of 9 conductors, and so the field solver will produce a 9×9 matrix with 81 capacitance values. A filter 930 then filters down these values to just the primary capacitance component values of interest, e.g., the self-capacitance of the central layer, central conductor, and the capacitances between that conductor and each of its 8 neighbors, as shown in FIG. 16.

For each candidate geometric wire structure, the training data generation flow of FIG. 9 generates sample wire structure using a range of different widths and/or spacings. Each generated wire structure is a known input X. To produce this input's corresponding known output Y, the training data generation flow (1) produces the 3-channel rasterized image for each generated wire structure, (2) produces this image's extruded 3-D representation, and then (3) generates the filtered capacitance vector output by the field solver and filter. The filtered capacitance vector is the known output Y of the training set with the known input X. The large set of samples so generated is partitioned into a training set (e.g., 80% of the samples), and a validation set (e.g., 20% of the samples), following deep learning best practices.

Figure 10:
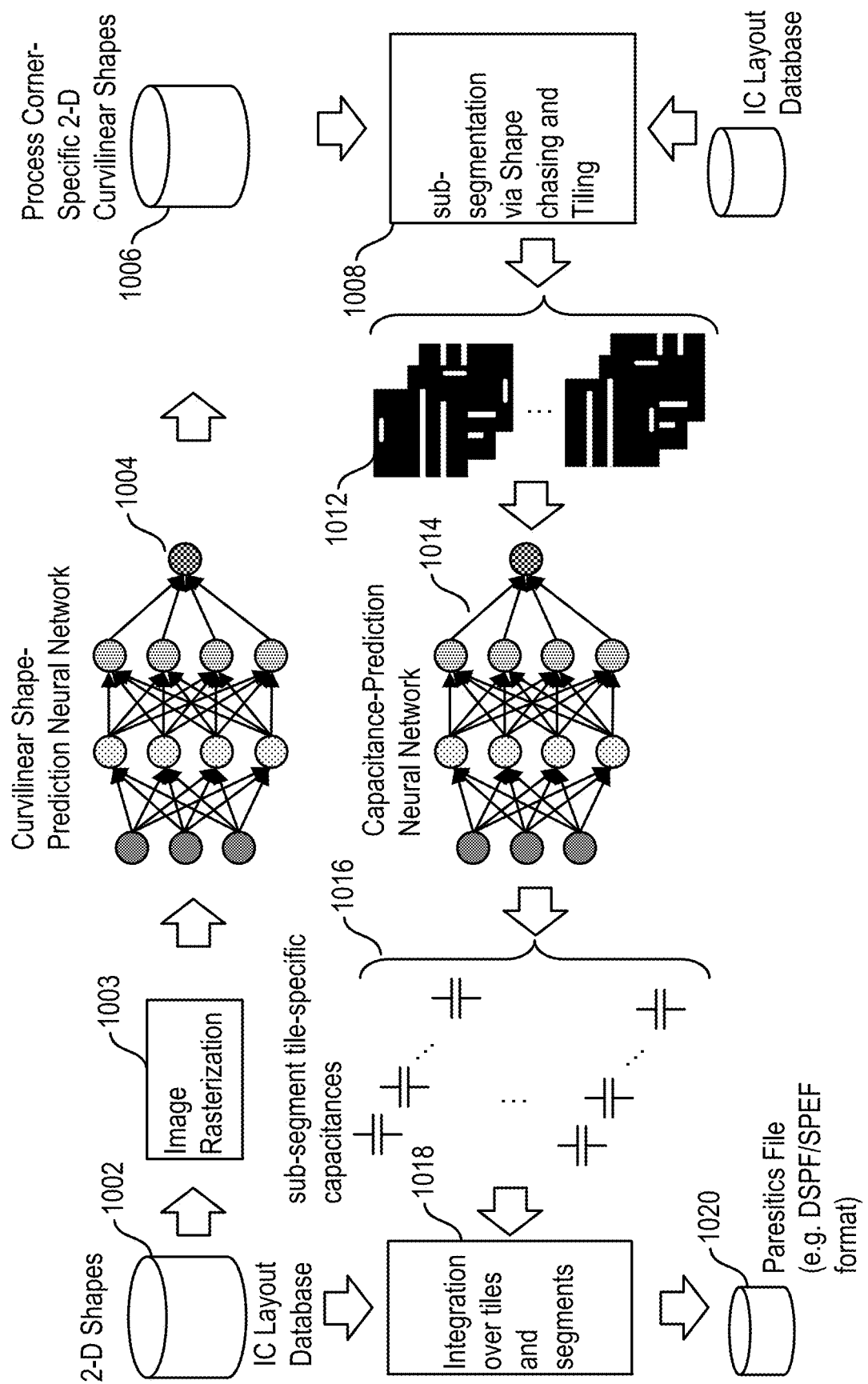
FIG. 10 illustrates a flow to calculate parasitics using tiles, in accordance with some embodiments.

FIG. 10 illustrates a data flow diagram for a CNN-based full capacitance extraction method. An IC design 1002 containing 2-D layout shapes on multiple layouts has its shapes rasterized by an image rasterizer 1003. The rasterized images (defined in the pixel-domain) are then provided as input to a trained curvilinear prediction neural network 1004 running on GPU/TPU devices (a single corner-specific set of curvilinear shapes in the figure for simplicity). The neural network 1004 performs a rapid inference operation that produces a set of process-corner-specific curvilinear 2-D shapes representing what will be manufactured on a substrate at each process corner.

The curvilinear prediction network may be trained using the methods disclosed in the above-incorporated U.S. Application Publication 2022/0128899. The resulting wafer shape contours are computed and stored in a database 1006. For each corner-specific set of curvilinear wafer shapes stored in the database 1006, the corresponding curvilinear interconnect wire segments of a net to be extracted are located via shape-chasing process 1008. As shown, this process also uses the originally drawn wafer shapes in the IC layout and their corresponding connectivity.

The process 1008 also breaks the curvilinear wire segments into sub-segments, each representing a 2T+1 track-width length of interconnect wire with T being the number of tracks. In some embodiments, the number of tracks T equals 4 but other embodiments use a different number of tracks (e.g., 5). Each sub-segment is then explored in the X and Y directions in a square region to find the nearest neighbor wires on the same layer, and the crossover/crossunder wires on the interconnect layers above and below, within +/−T tracks of the interconnect of interest.

In some embodiments, the process 1008 produces a square tile 3-channel raster image 1012 to represent each interconnect sub-segment, its same-layer nearest neighbors within +/−T tracks to the left and right, and up to 2T+1 crossover/crossunder wires in the vicinity on the layers above and below. The capacitance array to be inferred will contain 2*(2T+1)+3 slots (e.g., 21 slots, for 4 tracks). Each such sub-segment tile is rendered as a 3-channel, two-dimensional image. In other embodiments, the tile image for the middle layer i capture up to T lateral neighbors on either side of the conductor being extracted, i.e., not just the two closest lateral neighbors. In this case, the capacitance array to be inferred will contain 3*(2T+1) slots (e.g., 27 slots, with 9 per each of 3 layers when 4 tracks are used).

The generated sub-segment tiles representing the interconnect sub-segments are then passed into a trained capacitance prediction neural network 1014, which predicts/infers coupling capacitance values. In some embodiments, the neural network 1014 has a similar architecture to the neural network 800 of FIG. 8, though the number of outputs is different (for example, 23 or 27 outputs when 4 tracks are used). The neural network 1014 computes all relevant capacitances for each sub-segment tile (also called sub-segment area below). In sum, FIG. 10 includes a first neural network 1004 to produce predicted curvilinear shapes from the rasterized images of the IC design shapes, and a second neural network 1014 to calculate predicted parasitic capacitances of the curvilinear shapes using the set of process technology information.

As shown, the output of the second neural network 1014 are the sub-segment, tile specific capacitances 1016 that are supplied as input to an integration process 1018. For each interconnect segment from the original layout, the process 1018 gathers the segment's related sub-segment-specific capacitances and integrates over all the related sub-segment tiles. This flow adds the computed capacitances together according to the interconnect connectivity. This integration will be further described below by reference to FIG. 11. The process 1018 outputs the integrated capacitance values for all interconnects to a standard parasitic format 1020, such as DSPF/SPEF files, or Synopsys GPD files for example.

Figure 11:
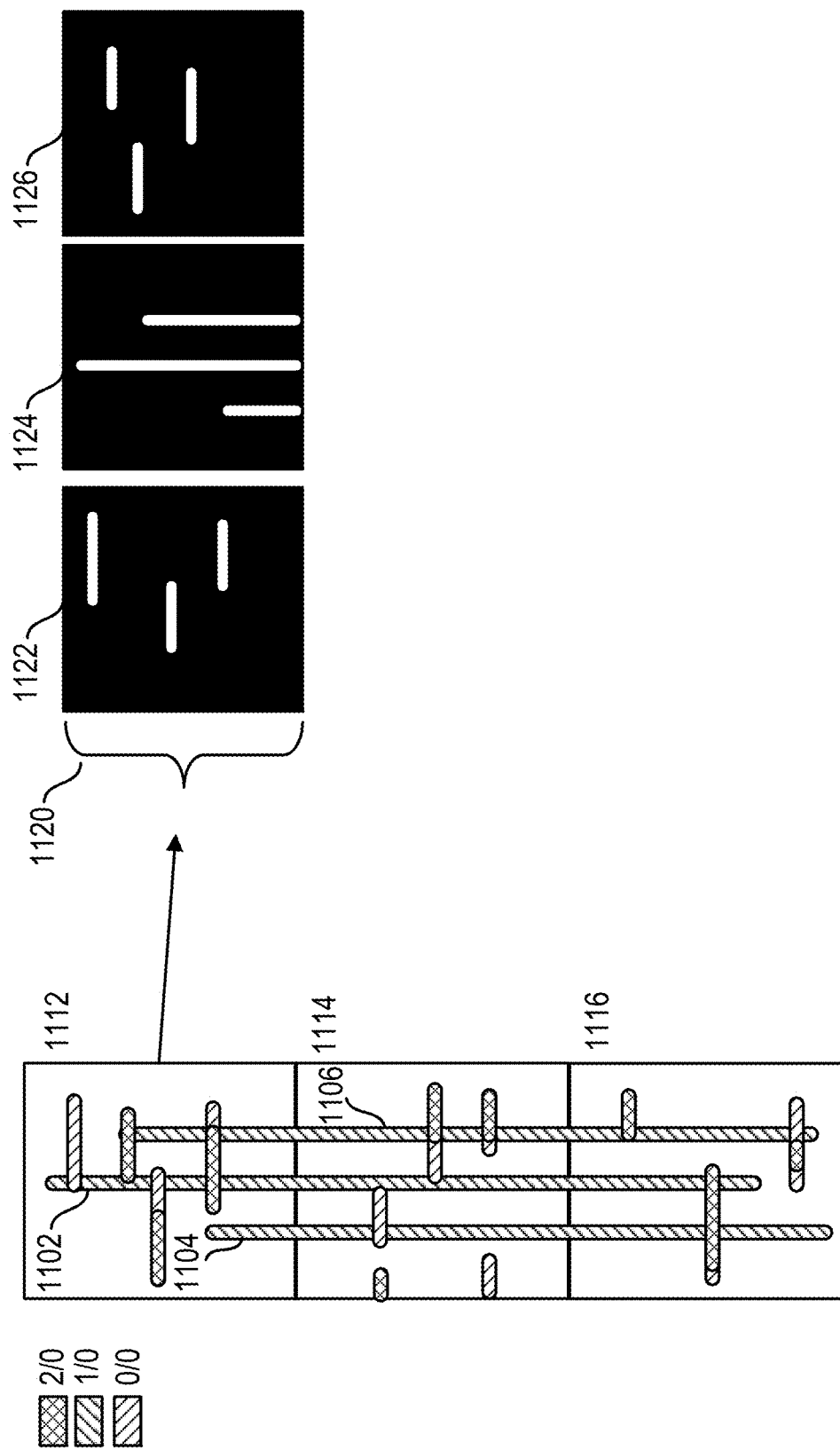
FIG. 11 illustrates tiled data, in accordance with some embodiments.

FIG. 11 provides an example to illustrate the tiling and rasterization process used in some embodiments. This example illustrates the manufactured curvilinear shapes of some conductors of interest. In this example, the method extracts the capacitances with respect to a central vertical conductor 1102 on layer "1/0" in the design. Intuitively, the conductor 1102 will have large lateral capacitances to its same layer neighbors 1104 and 1106 to the left and right, which run parallel to it substantially though with different spacings. The conductor 1102 will also have fringing/overlap capacitances to shapes on layers above (layer "2/0" in the design) and layers below (layer "0/0" in the design).

Thus, the tiling process of some embodiments tiles the vertical conductor 1102 into multiple sub-segments. In this example, the tiling process results in three tiles 1112, 1114 and 1116, each containing a portion of the center vertical conductor. Each tile also contains two same-layer nearest neighbor lateral conductor sub-segments. Additionally, three conductor shapes within a 4-track window are also present on the top and bottom orthogonally routed layers.

Each 3-layer tile from the tiling process is then rasterized into a 3-channel, 2-D 60×60 pixel raster image 1120 with 10 nm pixels. FIG. 11 illustrates the 3-channel image for the tile 1112. Here, the 3-channel image is broken out separately, such that each channel image 1122-1126 shows pixels representative of the interconnect sub-segments on the respective interconnect layer.

During inference, the 3-channel 2-D tile raster images are input to the capacitance prediction convolutional neural network 1014, and up to 27 capacitance values are predicted for each of the 3 tiles, representing the self-capacitance of the central layer center conductor, its coupling capacitance to the conductors in the lateral neighboring tracks, and its coupling capacitance to each of the crossover/crossunder tracks represented in the top/bottom channels of the tile image. As mentioned above, for the example described in FIG. 10, quantities other than 27 may be used in other embodiments.

After inferencing, the resulting capacitances are then summed over all tiles, i.e., are added together according to the connectivity of the interconnect portions. For example, to obtain the total per-corner self-capacitance of the central vertical conductor 1102 on layer "1/0", the self-capacitances of the central conductor across each of the three tiles 1112-6 are summed.

Figure 12:
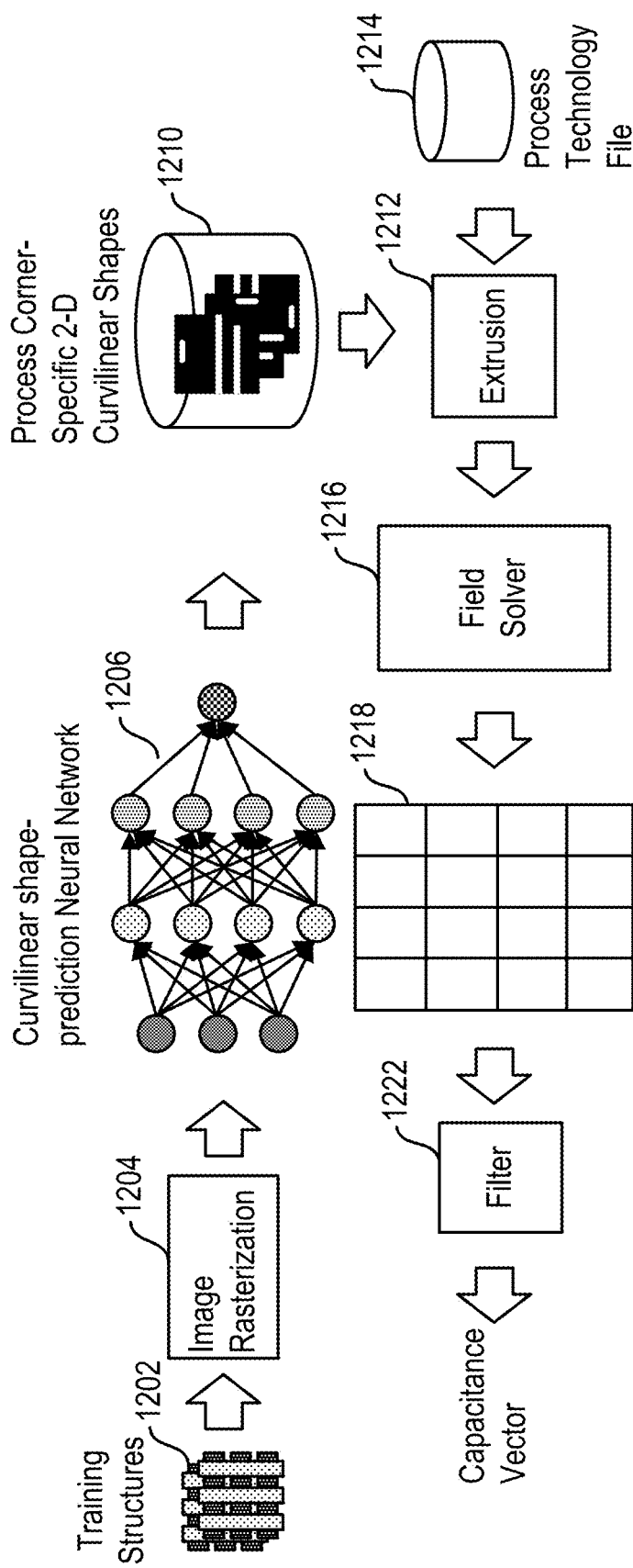
FIG. 12 illustrates a flow in training a neural network to generate tiles, in accordance with some embodiments.

FIG. 12 depicts a flow to generate training data with which to train the neural network for tile-based capacitance extraction. In this example, a variety of multi-layer (e.g., 3-layer), 2-D interconnect structures are generated that fit in squares comprising N×N, such as 9×9, track slots. The structures are stored in an IC design database 1202 and split out into their individual layers. An image rasterizer 1204 then rasterizes the structure content for each layer as a single-channel, 2-D image, and then combines the individual layers across three layers into a 3-channel, 2-D image.

These raster images are then consumed by the curvilinear prediction neural network 1206. An example of such a neural network is the neural network described above or one of the neural networks disclosed in U.S. Application Publication 2022/0128899. This neural network 1206 outputs per process corner curvilinear images 1210 corresponding to the outputs of the manufacturing process. The curvilinear 2-D wafer shapes for the three interconnect layers are gathered for each process corner and supplied to an extrusion process 1212.

This process 1212 extrudes the curvilinear 2-D wafer shapes to 3-D using the layer-specific wire height and dielectric information in the process technology file 1214, and the resulting 3-D interconnect structures are input to the field solver 1216. The field solver produces an N×N capacitance matrix 1218 per process corner as output, which is then filtered by the filter 1222 to the capacitances of interest, i.e., the coupling capacitance between the center layer central conductor of interest, and the conductors on the other tracks on all three layers.

For each interconnect structure sample, the per-corner 3-channel 2-D curvilinear image tile used as output from the curvilinear shape-prediction neural network 1206, and the corresponding per-corner capacitance vector output by the filter 1222 are gathered as the inputs X and outputs Y respectively to be used when training the capacitance prediction neural network.

During the generation of the 2-D 3-layer structures, each structure may contain wire segments of various lengths, appearing in any of the valid track positions. Wires may run the full width or height of the tile, or may run for a partial width or length. In some embodiments, wires are placed on the available track positions, using a set range of wire lengths. For any track position except that of the central layer center conductor, the wire length may be as short as zero length, i.e., wire may be absent in a particular track location. Non-zero wire lengths may be quite short (e.g., one track width), or may run the full 9-track width of the structure. The start/end position of each wire within its track may also be snapped to a set range of positions, e.g., the routing track crossing points.

Some embodiments allow the training space to be sampled in a structured, grid-like manner. In other embodiments, a Monte Carlo approach is taken to populate the training space. Here, wire start and end positions for each wire are randomly generated for each track. Again, wire lengths for any track position (except for the center layer central conductor) may be as short as zero. Training samples with empty track positions are assigned a capacitance value of 0 at those positions, and solver-produced capacitance values are used for the non-empty positions.

Figure 13:
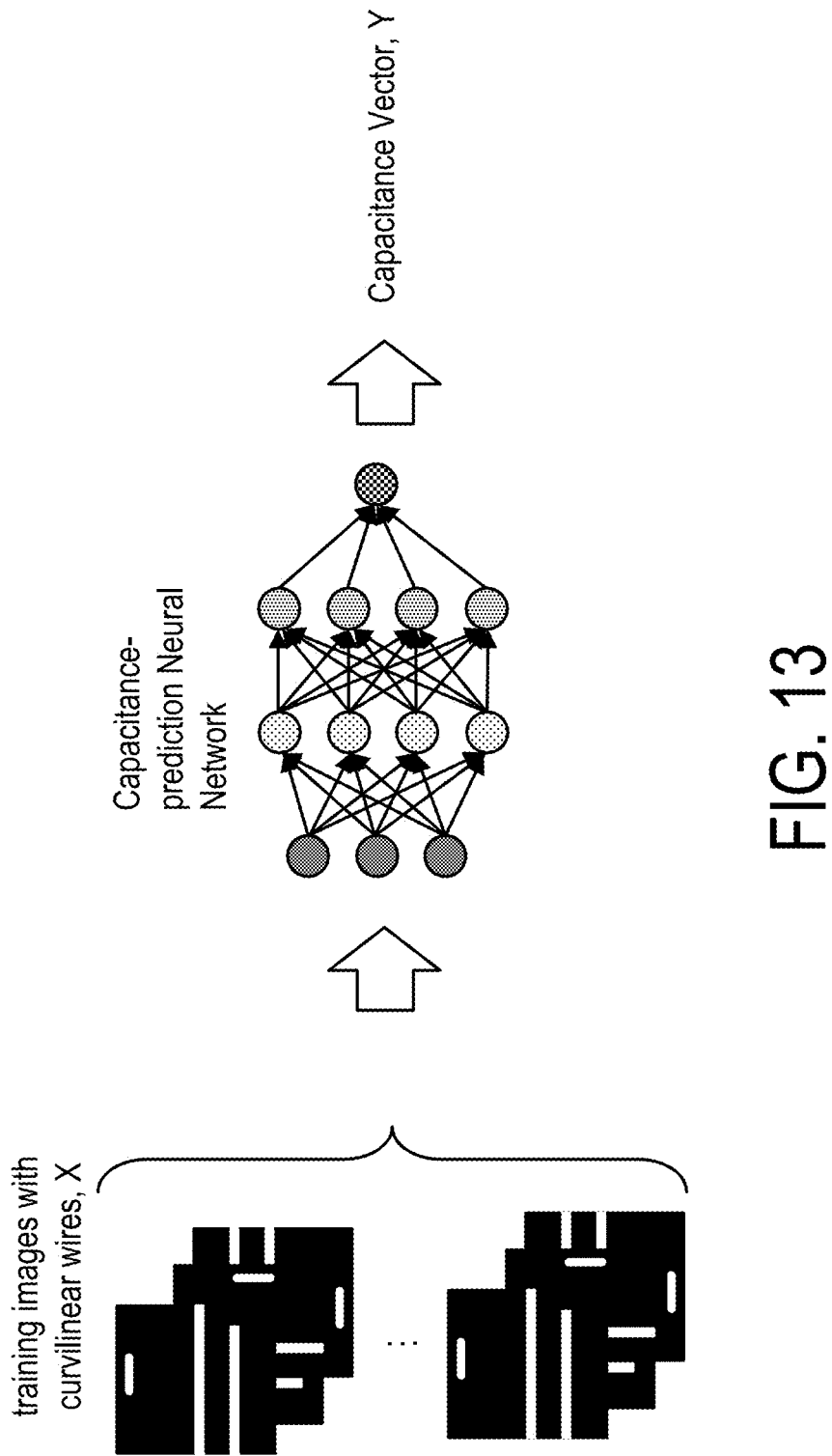
FIG. 13 illustrates a neural network to calculate parasitics using tiles, in accordance with some embodiments.

FIG. 13 illustrates the training data sets used in some embodiments to train a neural network that produces parasitic capacitance values. As shown, these embodiments use curvilinear wire shapes as the input values of each training set and the known capacitance values associated with these curvilinear wire shapes as the output values of each training set. Training samples using set of process technology information produces a set of trained weights which are preserved for each process technology.

Figure 14:
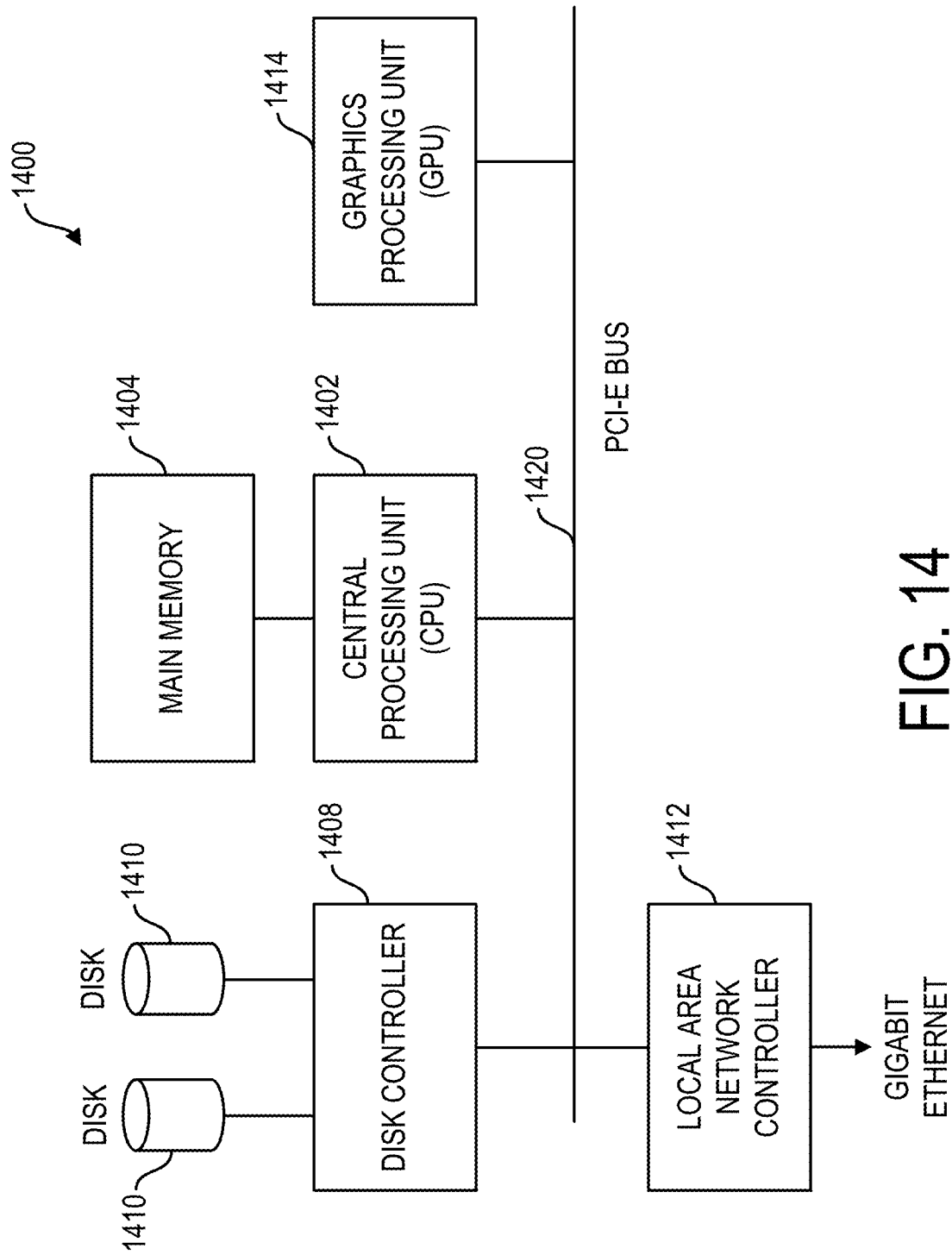
FIGS. 14 and 15 are schematics of GPU system diagrams, in accordance with some embodiments.

FIG. 14 illustrates an example of a computing hardware device 1400 that may be used to perform the calculations described in this disclosure. Computing hardware device 1400 comprises a central processing unit (CPU) 1402, with attached main memory 1404. The CPU may comprise, for example, eight processing cores, thereby enhancing performance of any parts of the computer software that are multi-threaded. The size of main memory 1404 may be, for example, 64 G-bytes. The CPU 1402 is connected to a Peripheral Component Interconnect Express (PCIe) bus 1420. A graphics processing unit (GPU) 1414 is also connected to the PCIe bus. In computing hardware device 1400 the GPU 1414 may or may not be connected to a graphics output device such as a video monitor. If not connected to a graphics output device, GPU 1414 may be used purely as a high-speed parallel computation engine. The computing software may obtain significantly higher performance by using the GPU for a portion of the calculations, compared to using CPU 1402 for all the calculations. The CPU 1402 communicates with the GPU 1414 via PCIe bus 1420. In other embodiments (not illustrated) GPU 1414 may be integrated with CPU 1402, rather than being connected to PCIe bus 1420. Disk controller 1408 may also be attached to the PCIe bus, with, for example, two disks 1410 connected to disk controller 1408. Finally, a local area network (LAN) controller 1412 may also be attached to the PCIe bus, and provides Gigabit Ethernet (GbE) connectivity to other computers. In some embodiments, the computer software and/or the design data are stored on disks 1410. In other embodiments, either the computer programs or the design data or both the computer programs and the design data may be accessed from other computers or file serving hardware via the GbE Ethernet.

Figure 15:
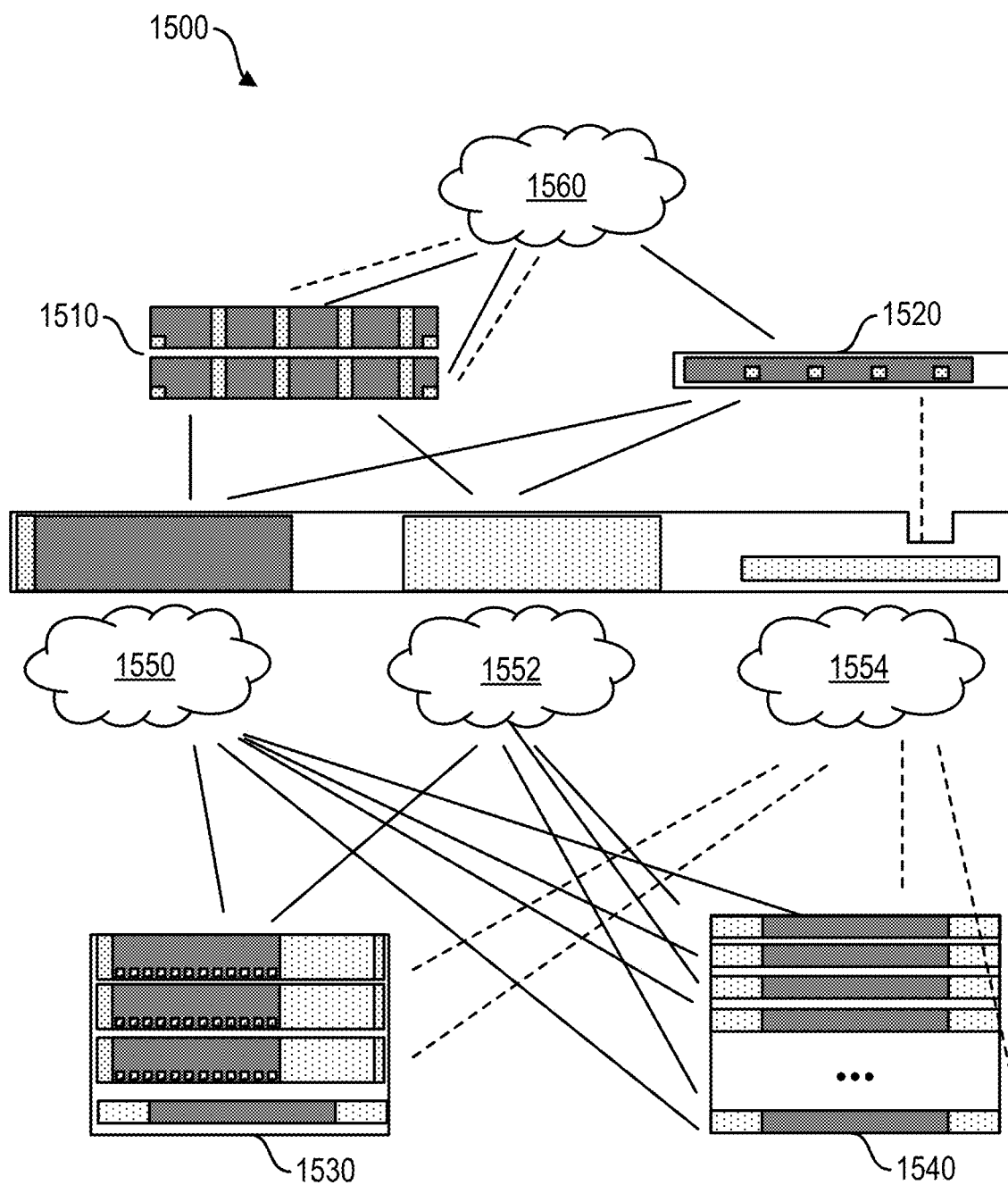

FIG. 15 is another embodiment of a system for performing the computations of the present embodiments. The system 1500 may also be referred to as a CDP, and includes a master node 1510, an optional viewing node 1520, an optional network file system 1530, and a GPU-enabled computing node 1540. Viewing node 1520 may not exist or instead have only one node, or may have other numbers of nodes. GPU-enabled computing node 1540 can include one or more GPU-enabled nodes forming a cluster. Each GPU-enabled computing node 1540 may comprise, for example, a GPU, a CPU, a paired GPU and CPU, multiple GPUs for a CPU, or other combinations of GPUs and CPUs. The GPU and/or CPU may be on a single chip, such as a GPU chip having a CPU that is accelerated by the GPU on that chip, or a CPU chip having a GPU that accelerates the CPU. A GPU may be substituted by another co-processor.

The master node 1510 and viewing node 1520 may be connected to network file system 1530 and GPU-enabled computing nodes 1540 via switches and high-speed networks such as networks 1550, 1552 and 1554. In an example embodiment, networks 1550 can be a 56 Gbps network, 1552 can be a 1 Gbps network and 1554 can be a management network. In various embodiments, fewer or greater numbers of these networks may be present, and there may be various combinations of types of networks such as high and low speeds. The master node 1510 controls the CDP 1500. Outside systems can connect to the master node 1510 from an external network 1560. In some embodiments, a job may be launched from an outside system. The data for the job is loaded onto the network file system 1530 prior to launching the job, and a program is used to dispatch and monitor tasks on the GPU-enabled computing nodes 1540. The progress of the job may be seen via a graphical interface, such as the viewing node 1520, or by a user on the master node 1510. The task is executed on the CPU using a script which runs the appropriate executables on the CPU. The executables connect to the GPUs, run various compute tasks, and then disconnect from the GPU. The master node 1510 may also be used to disable any failing GPU-enabled computing nodes 1540 and then operate as though that node did not exist.

While the specification has been described in detail with respect to specific embodiments, it will be appreciated that those skilled in the art, upon attaining an understanding of the foregoing, may readily conceive of alterations to, variations of, and equivalents to these embodiments. These and other modifications and variations to the present methods may be practiced by those of ordinary skill in the art, without departing from the scope of the present subject matter, which is more particularly set forth in the appended claims. For instance, even though curvilinear shapes are mentioned as being used by some embodiments, one of ordinary skill will realize that rectilinear or arbitrary shapes are used to represent a design in other embodiments.

Furthermore, those of ordinary skill in the art will appreciate that the descriptions above are by way of example only, and is not intended to be limiting. Steps can be added to, taken from or modified from the steps in this specification without deviating from the scope of the invention. In general, any flowcharts presented are only intended to indicate one possible sequence of basic operations to achieve a function, and many variations are possible. Thus, it is intended that the present subject matter covers such modifications and variations as come within the scope of the appended claims and their equivalents.

The invention claimed is:

1. A method for calculating parasitic parameters for wire structures that are to be manufactured on a semiconductor substrate and that are to be defined in one or more semiconductor designs, the method comprising:
   receiving a first wire structure that includes a plurality of rectilinear shapes associated with one or more semiconductor designs;
   generating, from the first wire structure, a second wire structure comprising a plurality of curvilinear shapes; and
   using the second wire structure to generate parasitic parameters for specifying parasitic effects experienced by one or more wire structures of the one or more semiconductor designs.

2. The method of claim 1, wherein the second wire structure with the curvilinear shapes is a structure that is predicted to be produced once the first wire structure is manufactured, and is thereby a predicted manufactured structure of the first wire structure.

3. The method of claim 2, wherein generating the second wire structure comprises supplying the first wire structure to a machine-trained network to produce the second wire structure.

4. The method of claim 3, wherein the machine-trained network is a neural network with a plurality of machine-trained neurons.

5. The method of claim 2, wherein generating the second wire structure comprises using a software simulator to generate the second wire structure as the predicted manufactured structure.

6. The method of claim 1, wherein the first and second wire structures are defined to include two-dimensional (2D) shapes, the method further comprising:
   receiving a set of manufacturing process technology information associated with the semiconductor design;
   using the set of manufacturing process technology information to produce a three-dimensional (3-D) shape from the second wire structure; and
   providing the 3-D shape to a field solver to produce a set of parasitic parameters.

7. The method of claim 6, wherein the set of manufacturing process technology information comprises wire heights and dielectric thickness.

8. The method of claim 6, wherein the set of parasitic parameters are used to train a machine-trained network to produce parasitic coefficients for different wire structures of different semiconductor designs, the method further comprising:
   extracting a particular wire structure from a particular semiconductor design;
   rasterizing the particular wire structure to produce a pixel-based definition of the particular wire structure;
   supplying the pixel-based definition to the machine-trained network to produce a plurality of parasitic coefficients for the particular wire structure; and
   using the produced plurality of parasitic coefficients to compute a parasitic value that represents a parasitic effect on the particular wire structure.

9. The method of claim 6, wherein the set of parasitic parameters are used to train a machine-trained network to produce parasitic values for different wire structures of different semiconductor designs, the method further comprising
   extracting a particular wire structure from a particular semiconductor design;
   dividing the particular wire structure with a tile structure that comprises a plurality of tiles, the divided particular wire structure comprising a plurality of wire structures each of which falls within a different tile;
   rasterizing each of the plurality of wire structures to produce a pixel-based definition of each wire structure;
   supplying each pixel-based definition to the machine-trained network to produce a tile-specific parasitic value; and
   computing an overall parasitic value from the produced tile-specific parasitic values, the overall parasitic value representing a parasitic effect on the particular wire structure.

10. The method of claim 1, wherein rectilinear shapes comprise shapes that are produced by using straight line segments, while curvilinear shapes are shapes that are produced by using at least one curved line segment.

11. A non-transitory machine-readable medium storing a program which when executed by at least one processing unit calculates parasitic parameters for wire structures that are to be manufactured on a semiconductor substrate and that are to be defined in one or more semiconductor designs, the program comprising sets of instructions for:
   receiving a first wire structure that includes a plurality of rectilinear shapes associated with one or more semiconductor designs;

generating, from the first wire structure, a second wire structure comprising a plurality of curvilinear shapes; and using the second wire structure to generate parasitic parameters for specifying parasitic effects experienced by one or more wire structures of the one or more semiconductor designs.

12. The non-transitory machine-readable medium of claim 11, wherein the second wire structure with the curvilinear shapes is a structure that is predicted to be produced once the first wire structure is manufactured, and is thereby a predicted manufactured structure of the first wire structure.

13. The non-transitory machine-readable medium of claim 12, wherein the set of instructions for generating the second wire structure comprises a set of instructions for supplying the first wire structure to a machine-trained network to produce the second wire structure.

14. The non-transitory machine-readable medium of claim 13, wherein the machine-trained network is a neural network with a plurality of machine-trained neurons.

15. The non-transitory machine-readable medium of claim 12, wherein the set of instructions for generating the second wire structure comprises a set of instructions for using a software simulator to generate the second wire structure as the predicted manufactured structure.

16. The non-transitory machine-readable medium of claim 11, wherein the first and second wire structures are defined to include two-dimensional (2D) shapes, the program further comprising sets of instructions for:

receiving a set of manufacturing process technology information associated with the semiconductor design;

using the set of manufacturing process technology information to produce a three-dimensional (3-D) shape from the second wire structure; and providing the 3-D shape to a field solver to produce a set of parasitic parameters.

17. The non-transitory machine-readable medium of claim 16, wherein the set of manufacturing process technology information comprises wire heights and dielectric thickness.

18. The non-transitory machine-readable medium of claim 16, wherein the set of parasitic parameters are used to train a machine-trained network to produce parasitic coefficients for different wire structures of different semiconductor designs, the program further comprising sets of instructions for:

extracting a particular wire structure from a particular semiconductor design;

rasterizing the particular wire structure to produce a pixel-based definition of the particular wire structure;

supplying the pixel-based definition to the machine-trained network to produce a plurality of parasitic coefficients for the particular wire structure; and using the produced plurality of parasitic coefficients to compute a parasitic value that represents a parasitic effect on the particular wire structure.

19. The non-transitory machine-readable medium of claim 16, wherein the set of parasitic parameters are used to train a machine-trained network to produce parasitic coefficients for different wire structures of different semiconductor designs, the program further comprising sets of instructions for:

extracting a particular wire structure from a particular semiconductor design;

dividing the particular wire structure with a tile structure that comprises a plurality of tiles, the divided particular wire structure comprising a plurality of wire structures each of which falls within a different tile;

rasterizing each of the plurality of wire structures to produce a pixel-based definition of each wire structure;

supplying each pixel-based definition to the machine-trained network to produce a tile-specific parasitic value; and computing an overall parasitic value from the produced parasitic values, the overall parasitic value representing a parasitic effect on the particular wire structure.

20. The non-transitory machine-readable medium of claim 11, wherein rectilinear shapes comprise shapes that are produced by using straight line segments, while curvilinear shapes are shapes that are produced by using at least one curved line segment.

* * * * *